(12) United States Patent
Yagi et al.

(10) Patent No.: US 7,685,670 B2
(45) Date of Patent: Mar. 30, 2010

(54) MOTOR APPARATUS AND WIPER MOTOR APPARATUS

(75) Inventors: Hideyuki Yagi, Toyohashi (JP); Takayuki Imamura, Hamamatsu (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 1017 days.

(21) Appl. No.: 10/978,561

(22) Filed: Nov. 2, 2004

(65) Prior Publication Data

US 2005/0097699 A1    May 12, 2005

(30) Foreign Application Priority Data

Nov. 7, 2003   (JP) .............................. 2003-378101
Nov. 7, 2003   (JP) .............................. 2003-378176
Aug. 9, 2004   (JP) .............................. 2004-232555

(51) Int. Cl.
   *F16D 7/02*      (2006.01)
(52) U.S. Cl. .................. 15/250.3; 15/250.31; 74/42; 74/425
(58) Field of Classification Search ................ 15/250.3, 15/250.31, 250.19; 74/42, 425
   See application file for complete search history.

(56) References Cited

U.S. PATENT DOCUMENTS

| | | | |
|---|---|---|---|
| 4,774,423 A | | 9/1988 | Karasawa et al. |
| 4,928,802 A | | 5/1990 | Weiss et al. |
| 4,991,903 A | | 2/1991 | Okabe et al. |
| 5,090,261 A | * | 2/1992 | Nakatsukasa ............. 74/89.14 |
| 5,212,999 A | * | 5/1993 | Kitada ...................... 74/425 |
| 5,566,577 A | | 10/1996 | Klar |
| 5,655,405 A | | 8/1997 | Lerouge et al. |
| 5,848,553 A | * | 12/1998 | Miyazaki ..................... 74/42 |
| 5,855,140 A | * | 1/1999 | Imamura ....................... 74/42 |
| 5,907,885 A | * | 6/1999 | Tilli et al. ................. 15/250.16 |
| 5,979,256 A | | 11/1999 | Kilker et al. |

(Continued)

FOREIGN PATENT DOCUMENTS

DE          1 580 926         12/1980

(Continued)

OTHER PUBLICATIONS

Office Action dated Nov. 2, 2007 in corresponding Chinese Patent Application No. 200410088332.6 (and English Translation).

(Continued)

*Primary Examiner*—Lee D Wilson
(74) *Attorney, Agent, or Firm*—Posz Law Group, PLC

(57) ABSTRACT

An input disk, a clutch disk and wave washers are installed to an output shaft to form an output shaft assembly of a motor apparatus. The input disk is axially non-detachable from the output shaft and is rotatable about an axis of the output shaft. The input disk is driven by a drive force supplied from a motor main body of the motor apparatus. The clutch disk is supported by the output shaft in such a manner that the clutch disk is non-rotatable relative to the output shaft and is axially movable along the output shaft relative to the input disk. The wave washers apply a resistive force against axial movement of the clutch disk from a coupled state, at which the input disk is coupled with the clutch disk to rotate together.

25 Claims, 19 Drawing Sheets

U.S. PATENT DOCUMENTS

| | | | | |
|---|---|---|---|---|
| 6,003,193 | A | * | 12/1999 | Rivin et al. ............... 15/250.3 |
| 6,026,536 | A | | 2/2000 | Miller et al. |
| 6,070,697 | A | | 6/2000 | Millard |
| 6,116,110 | A | * | 9/2000 | Maue et al. ............... 74/471 R |
| 6,205,612 | B1 | | 3/2001 | Tilli et al. |
| 6,449,798 | B1 | | 9/2002 | Rivin et al. |
| 6,493,900 | B1 | * | 12/2002 | Koumo et al. ............. 15/250.3 |
| 6,611,987 | B1 | * | 9/2003 | Nakazato et al. ......... 15/250.31 |
| 2005/0097698 | A1 | | 5/2005 | Yagi et al. |
| 2005/0097699 | A1 | * | 5/2005 | Yagi et al. ................ 15/250.3 |
| 2006/0059646 | A1 | | 3/2006 | Bendo |
| 2006/0101603 | A1 | | 5/2006 | Yagi |
| 2006/0117514 | A1 | * | 6/2006 | Yagi et al. ................ 15/250.3 |

FOREIGN PATENT DOCUMENTS

| | | |
|---|---|---|
| DE | 197 56 157 | 4/1999 |
| EP | 0 904 983 | 3/1999 |
| JP | A-64-044367 | 2/1989 |
| JP | 5-3654 | 1/1993 |
| JP | A-9-118202 | 5/1997 |
| JP | A-11-348737 | 12/1999 |
| JP | A-2001-138873 | 5/2001 |
| JP | B2-3550049 | 4/2004 |
| WO | WO 98/45149 | 10/1998 |
| WO | WO 99/19184 | 4/1999 |

OTHER PUBLICATIONS

Office Action dated Dec. 14, 2007 in corresponding European Patent Application No. 04 026 322.0.

Office Communication dated Feb. 15, 2008 in corresponding European Patent Application No. 05 024 565.3-2424.

Extended Search Report issued from European Patent Office issued on Feb. 20, 2006 for the corresponding European patent application No. 05024565.2-2424.

European communication dated Jun. 26, 2007 issued in the related European Application No. 04 026 323.8 (corresponding EP application of 10/978,560).

Chinese Office Action dated Sep. 7, 2007 in corresponding Chinese Patent Application No. 200410092293.7 (and English Translation).

Office Communication issued from European Patent Office issued on Nov. 22, 2005 for the corresponding European patent application No. 04026322.0-2424.

Office Communication dated Jun. 23, 2008 in related U.S. Appl. No. 10/978,560.

Office Action dated Oct. 28, 2008 in corresponding Japanese patent application No. 2004-232554 (and English translation).

Office Action dated Oct. 21, 2008 in corresponding Japanese patent application No. 2004-232555 (and English translation).

Office Action dated Jan. 6, 2009 in related U.S. Appl. No. 10/978,560.

Office Action dated Dec. 16, 2008 in corresponding EPC Application No. 04 026 322.0 (and English Translation).

Office Action dated Mar. 3, 2009 in corresponding Japanese patent application No. 2004-342182 (and English translation).

Office Action dated Mar. 17, 2009 in related U.S. Appl. No. 11/265,146.

Notice of Allowance dated Apr. 8, 2009 in related U.S. Appl. No. 10/978,560.

Final Office Action mailed Aug. 21, 2009 in related U.S. Appl. No. 11/265,146.

Office Action dated Sep. 11, 2009 in corresponding Chinese Patent Application No. 2005101286702 (and English translation).

* cited by examiner

MOTOR APPARATUS AND WIPER MOTOR APPARATUS

CROSS REFERENCE TO RELATED APPLICATION

This application is based on and incorporates herein by reference Japanese Patent Application No. 2003-378176 filed on Nov. 7, 2003, Japanese Patent Application No. 2003-378101 filed on Nov. 7, 2003 and Japanese Patent Application No. 2004-232555 filed on Aug. 9, 2004. This application is also related to U.S. application Ser. No. 10/978,560, entitled "CLUTCH DEVICE, MOTOR APPARATUS AND WIPER SYSTEM," filed on Nov. 2, 2004 and to U.S. application Ser. No. 11/265,146, entitled "MOTOR APPARATUS," filed on Nov. 3, 2005.

BACKGROUND OF THE INVENTION

1. Field of the Invention

The present invention relates to an output shaft assembly, which has a clutch arrangement, and also relates to a motor apparatus and a wiper motor apparatus, which have such an output shaft assembly.

2. Description of Related Art

For example, in a vehicle power window system for driving a window glass of a vehicle door or in a vehicle sunroof system for driving a sunroof lid, a motor apparatus is used as a drive source.

Japanese Unexamined Utility Model Publication No. H05-3654 discloses a motor apparatus, which has a speed reducing mechanism that decelerates rotation of a motor main body. The speed reducing mechanism includes a worm gear and a worm wheel. The worm gear is provided to an end of a rotatable shaft of the motor main body to rotate integrally with the rotatable shaft. The motor apparatus is used to drive the sunroof lid of the sunroof system. A friction clutch device (a friction clutch arrangement) is provided to an output shaft of the motor apparatus. The friction clutch device includes a friction member and a disk plate. The friction member is integrally formed in the worm wheel, and the disk plate is connected to the output shaft to rotate integrally with the output shaft. Furthermore, the disk plate is urged against the friction member by a spring to form frictional engagement between the disk plate and the friction member. In a normal operation, rotation of the motor main body is supplied to the friction clutch through the engagement between the worm gear and the worm wheel. Then, this drive force is transmitted through the frictional engagement between the friction member of the worm wheel and the disk plate, so that the output shaft connected to the disk plate is rotated integrally with the worm wheel to drive a sunroof lid. When an object is placed in a moving path of the sunroof lid, movement of the sunroof lid is stopped by the object to lock the output shaft. At this time, the friction member is slid relative to the disk plate, so that the worm wheel is rotated relative to the output shaft.

In this way, it is possible to limit damage to each component, such as the worm wheel, and also possible to limit burnout of the motor main body.

This kind of clutch device is also preferred in the vehicle wiper system. For example, in the wiper system, at the time of wiping a window glass by a wiper blade of a wiper, when heavy snow, which has been accumulated on a roof of the vehicle, falls onto the wiper blade and a wiper arm connected to the wiper blade, the wiper blade and the wiper arm are arrested by the fallen heavy snow or receive an excessively large external force from the fallen snow. Therefore, the excessively large external force is applied to corresponding components of the wiper system. When the above clutch device is provided in the wiper system, it is possible to limit damage to the corresponding components of the wiper system or to limit burnout of the motor main body. Furthermore, a strength of each corresponding component does not need to be set upon consideration of the excessively large external force.

However, in the previously proposed clutch device recited in Japanese Unexamined Utility Model Publication No. H05-3654, the spring is used to urge the disk plate against the friction member to generate the frictional resistive force. The spring is rotated together with the disk plate or is slid relative to the disk plate. In the former case, the spring rotates together with the disk plate, and the spring is slid relative to a support structure. In the latter case, the spring does not slid relative to the support structure but is slid relative to the disk plate. In each of these cases, at the time of driving the motor main body, when rotation of the motor main body is transmitted to the output shaft through the clutch device, a sliding loss of the spring occurs to reduce a transmission efficiency of the rotational force. Furthermore, a substantial noise could be generated due to the sliding movement.

In the above clutch device, at the time of locking the output shaft, the worm wheel (the driving side) is rotated relative to the output shaft (the driven side) to limit damage to the corresponding components. However, the performance is sacrificed to cause a reduction in the transmission efficiency of the rotational force and/or generation of the noise.

Furthermore, in the case of Japanese Unexamined Utility Model Publication No. H05-3654, when the components of the clutch device are installed to a housing of the motor apparatus one after another, an entire assembly operation of the motor apparatus is lengthened. Thus, it is desirable to provide the clutch device in a form of a sub-assembly of the motor apparatus, such as an output shaft assembly, in which the clutch device (or the clutch arrangement) is integrated with the output shaft of the motor apparatus. When the clutch device is preassembled as the output shaft assembly, the clutch arrangement can be simultaneously installed to the motor apparatus at the time of installing the output shaft. Thus, an entire assembly time of the motor apparatus can be shortened. Furthermore, when the clutch device is preassembled as the output shaft assembly, handling of the clutch device can be eased during, for example, transporting of the output shaft assembly from one assembling stage to another assembling stage of the motor apparatus since it is formed as a single component or a single assembly.

Apart from the above case, Japanese Unexamined Patent Publication No. H09-118202 discloses another wiper motor apparatus, which includes a worm wheel, a swing arm and a joint member. The worm wheel is meshed with a rotatable shaft of an armature, which is rotatably supported by a case. The swing arm is connected to a wiper shaft. One end of the joint member is connected to a predetermined point of the worm wheel, and the other end of the joint member is connected to the swing arm. Upon energization of the wiper motor apparatus, the armature is rotated to rotate the worm wheel. Then, the rotation of the worm wheel is converted to a swing motion of the swing arm through the joint member to reciprocally rotate the wiper shaft. Therefore, a wiper arm, which is directly installed to the wiper shaft, is swung to wipe a window glass of the vehicle.

Similar to the above case, in the non-operating state of the wiper where a wiper blade connected to the wiper arm is stopped and is thus held substantially parallel to a lower edge of the glass surface, when an external force, which is exerted by, for example, heavy snow, is applied to the wiper blade and the wiper arm, the wiper blade and the wiper arm are pressed downward beyond a lower turning point. At this time, the wiper shaft and the swing arm of the wiper motor apparatus are rotated further beyond a normal reciprocal rotational angular range. Therefore, the joint member, which is connected to the swing arm, or the worm wheel, which is connected to the joint member, could be damaged by the external force.

Thus, to limit the damage of the above components and to limit rotation of the wiper arm into a vehicle body region beyond the window glass area of the vehicle, in the wiper motor apparatus disclosed in Japanese Unexamined Patent Publication No. H09-118202, a rotational range limiting portion is provided at a location, which is outside of the normal reciprocal rotational angular range of the swing arm to limit the rotation of the swing arm beyond the predetermined reciprocal rotational angular range of the swing arm.

However, an excessively large external force could be applied to, for example, the wiper blade and the wiper arm even in a case where the wiper blade and the wiper arm are not placed outside of the predetermined reciprocal rotational angular range. In other words, the excessively large external force could be applied to, for example, the wiper blade and the wiper arm even in the case where the wiper blade and the wiper arm are operated within the predetermined reciprocal rotational angular range (a normal wiping range). This could be a case where heavy snow, which has been accumulated on a roof of the vehicle, falls onto the wiper blade and the wiper arm, which is operated and is located in the normal wiping range other than the lower turning point. In such a case, the wiper blade and the wiper arm are arrested by the fallen heavy snow or receive an excessively large external force from the fallen snow. Therefore, the excessively large external force is applied to the swing arm, the joint member, the worm wheel and/or the worm gear through the wiper shaft, so that these components could be damaged by the excessively large external force. Thus, the above-described disadvantage still exists.

Therefore, in the case of the wiper motor apparatus described in Japanese Unexamined Patent Publication No. H09-118202, each corresponding component of the wiper motor apparatus needs to be designed to withstand the above described excessively large external force.

SUMMARY OF THE INVENTION

The present invention addresses the above disadvantages. Thus, it is an objective of the present invention to provide an output shaft assembly including a clutch arrangement that limits damage to a corresponding component or limits burn-out of a motor main body upon application of an excessively large load to an output shaft of the output shaft assembly. It is another objective of the present invention to provide a motor apparatus and a wiper motor apparatus, which include such an output shaft assembly.

To achieve the objectives of the present invention, there is provided a motor apparatus, which includes an output shaft and a clutch arrangement. The clutch arrangement is installed to the output shaft. Furthermore, the clutch arrangement includes a first rotatable member, a second rotatable member and at least one resilient member. The first rotatable member has at least one first side mating portion and is supported by the output shaft on one output shaft end side of the output shaft in such a manner that the first rotatable member is axially non-detachable from the output shaft and is rotatable about an axis of the output shaft. The first rotatable member is rotated about the axis of the output shaft when a drive force is applied to the first rotatable member. The second rotatable member is located on the other output shaft end side of the output shaft with respect to the first rotatable member and is supported by the output shaft in such a manner that the second rotatable member is non-rotatable relative to the output shaft and is axially movable along the output shaft relative to the first rotatable member. The second rotatable member has at least one second side mating portion that is engageable with the at least one first side mating portion of the first rotatable member in an axial direction of the output shaft to couple between the first rotatable member and the second rotatable member and thereby to rotate the second rotatable member integrally with the first rotatable member. The at least one resilient member is arranged on the other output shaft end side of the second rotatable member and applies a resistive force against axial movement of the second rotatable member toward the other output shaft end side of the output shaft from a coupled state, at which the at least one first side mating portion and the at least one second side mating portion are engaged with one another.

To achieve the objectives of the present invention, there is also provided a motor apparatus, which includes the above output shaft assembly, a housing and a motor main body. The housing receives the output shaft assembly. The motor main body is connected to the output shaft assembly to supply the drive force to the first rotatable member of the output shaft assembly.

To achieve the objectives of the present invention, there is also provided a wiper motor apparatus for reciprocally swing a wiper. The wiper motor apparatus includes a motor main body, an output shaft assembly and a swing mechanism. The output shaft assembly is driven by the motor main body and includes an output shaft and a clutch arrangement. The output shaft is directly or indirectly connected to the wiper to reciprocally swing the wiper. The clutch arrangement is installed to the output shaft. The swing mechanism connects between the motor main body and the output shaft assembly and converts rotation of a rotatable shaft of the motor main body to reciprocal rotation of the output shaft. The clutch arrangement is provided between the output shaft and the swing mechanism to transmit a drive force from the swing mechanism to the output shaft. When a load applied to the output shaft is equal to or greater than a predetermined value, the clutch arrangement disables transmission of the drive force between the swing mechanism and the output shaft, so that relative rotation occurs between the swing mechanism and the output shaft.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
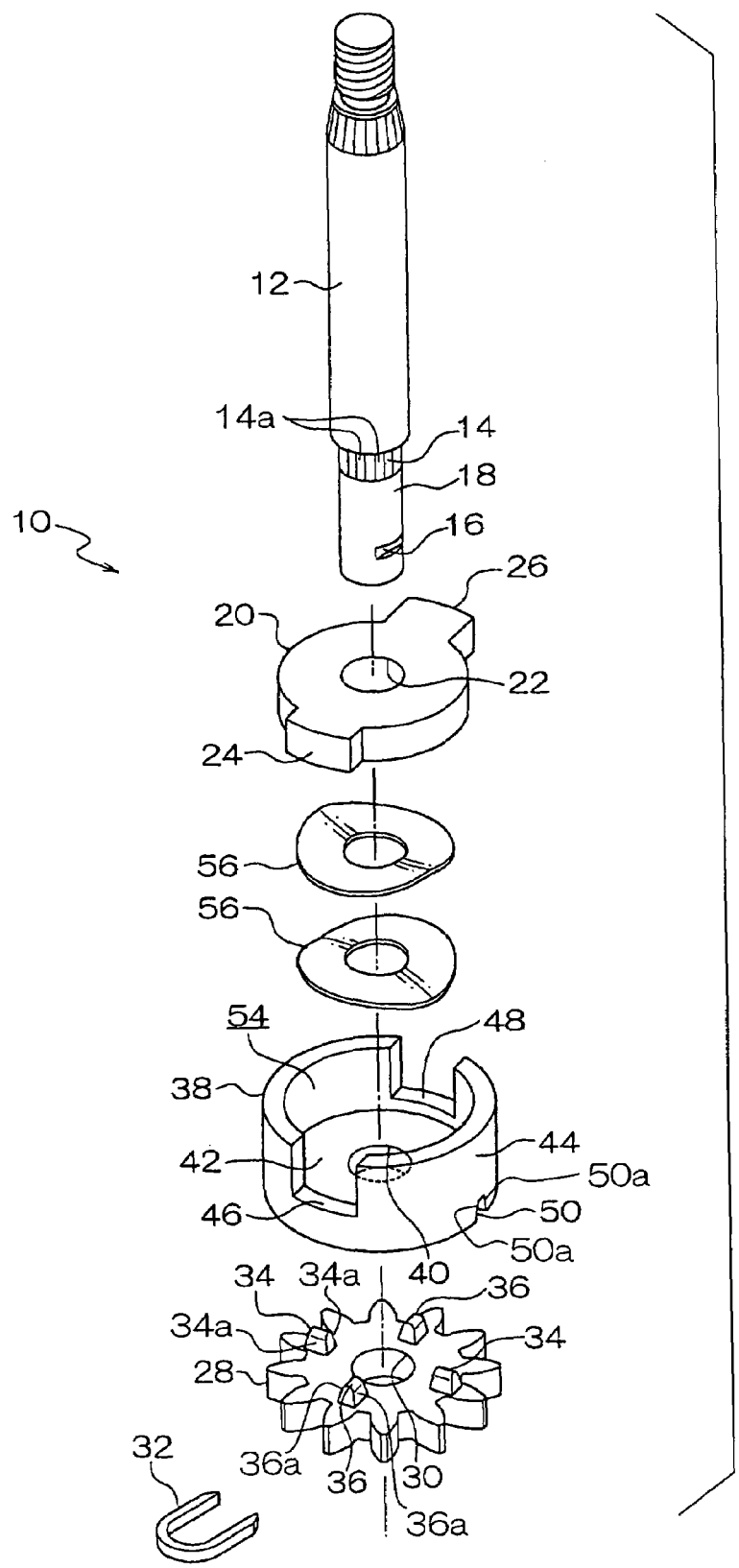
FIG. 1 is an exploded perspective view showing a structure of a clutch device of a first embodiment of the present invention.
Figure 2:
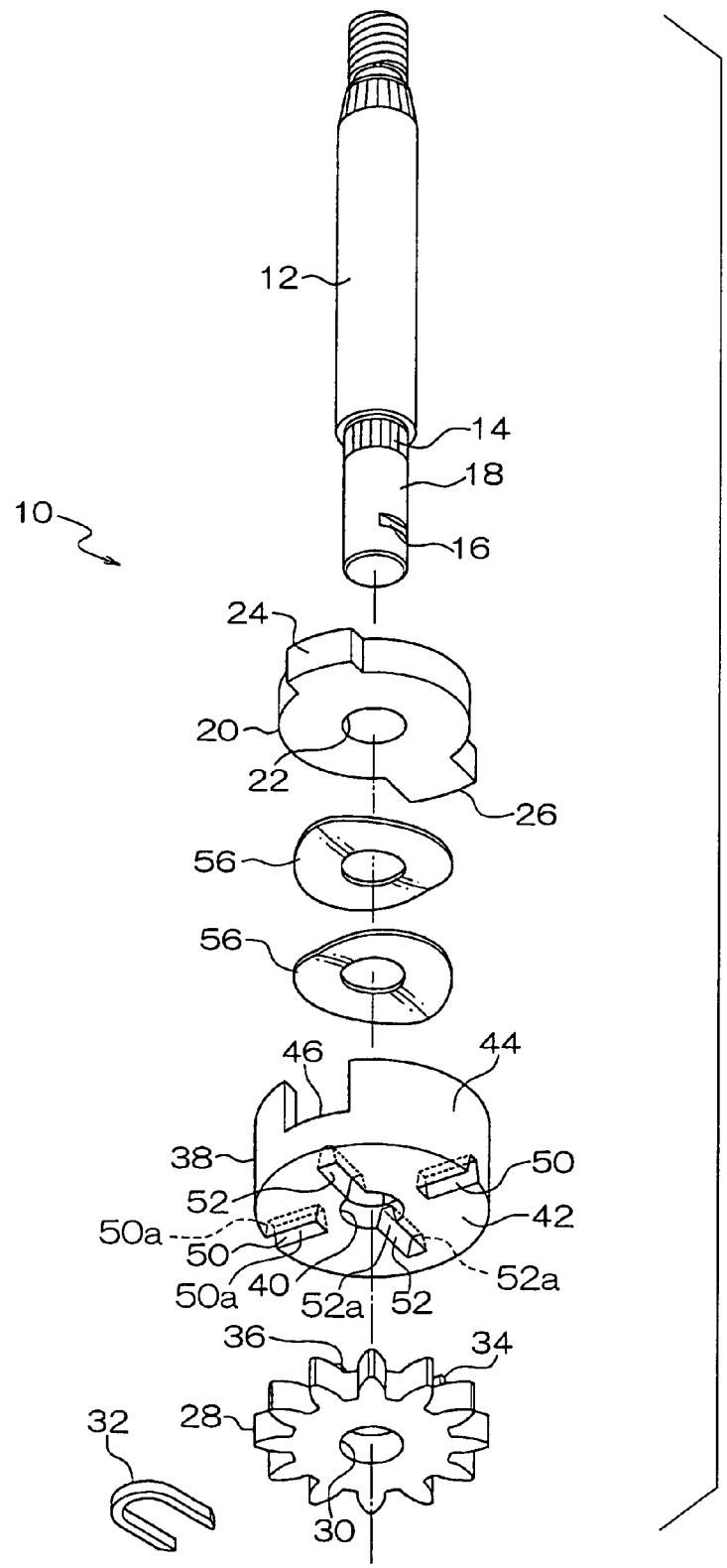
FIG. 2 is an exploded perspective view of the clutch device of the first embodiment of the present invention.

FIGS. 1 and 2 are exploded perspective views of a clutch device (serving as an output shaft assembly of the present invention) 10 according to a first embodiment of the present invention.

The clutch device 10 includes an output shaft 12. A base end portion (a rear end portion) of the output shaft 12 includes a rotation restraining portion 14, a removal limiting portion 16 and a relatively rotatable shaft portion 18. The rotation restraining portion 14 includes a plurality of axial ridges 14a. The removal limiting portion 16 is formed in a rear end of the rear end portion of the output shaft 12. The relatively rotatable shaft portion 18 is arranged between the rotation restraining portion 14 and the removal limiting portion 16.

A clutch base (a base member) 20 is secured to the rotation restraining portion 14 of the output shaft 12 by, for example, press fitting. The clutch base 20 is formed as a disk body and has a support hole 22 in its center. The support hole 22 is secured to the rotation restraining portion 14, so that the clutch base 20 rotates integrally with the output shaft 12. Furthermore, two fitting male portions 24, 26 are provided in an outer peripheral part of the clutch base 20 in such a manner that the fitting male portions 24, 26 are opposed to one another in a circumferential direction of the clutch base 20, i.e., are displaced 180 degrees from one another in the circumferential direction of the clutch base 20 and protrude in a radial direction of the output shaft 12. In other words, the fitting male portions 24, 26 are symmetrically disposed about an axis of the output shaft 12. A radial extent of the fitting male portion 26 is larger than a radial extent of the fitting male portion 24. The fitting male portions 24, 26 correspond to a clutch disk 38, which will be described later.

An input disk (a first rotatable member) 28 is installed to the removal limiting portion 16 of the output shaft 12. The input disk 28 is formed as a gear body or a gear member and has a shaft hole 30 in its center. The removal limiting portion 16 of the output shaft 12 is received through the shaft hole 30, and a removal limiting clip 32 is installed to an end of the removal limiting portion 16 to limit removal of the input disk 28 from the output shaft 12. Thus, the input disk 28 is coaxial with the output shaft 12 and is supported by the output shaft 12 at one axial end side (the end side opposite from the clutch base 20) of the output shaft 12 in such a manner that the input disk 28 is non-detachable from the output shaft 12 in an axial direction of the output shaft 12 and is rotatable relative to the output shaft 12. When a drive force is inputted to the input disk 28, the input disk 28 is rotated about the axis of the output shaft 12. Two pairs (first and second pairs) of mating male portions (first side mating portions) 34, 36 protrude from an end surface of the input disk 28 (a clutch base 20 side, i.e., the other axial end side of the output shaft 12) toward the clutch base 20.

The mating male portions (the mating male portions of the first pair) 34 of one of the two pairs of the mating male portions 34, 36 are opposed to one another in the circumferential direction, i.e., are displaced 180 degrees from one another in the circumferential direction. Furthermore, the mating male portions (the mating male portions of the second pair) 36 of the other one of the two pairs of the mating male portions 34, 36 are opposed to one another in the circumferential direction, i.e., are displaced 180 degrees from one another in the circumferential direction. Furthermore, the mating male portions 34 and the mating male portions 36 are arranged one after another at equal intervals (90 degree intervals in the circumferential direction). The mating male portions 34 of the one of the two pairs of mating male portions 34, 36 are located outward beyond the mating male portions 36 of the other one of the two pairs of mating male portions 34, 36 in a radial direction of the input disk 28 and extend into the teeth of the input disk 28. The two pairs of mating male portions 34, 36 also correspond to the clutch disk 38, which will be described later.

The clutch disk (a second rotatable member) 38 is supported by the relatively rotatable shaft portion 18 of the output shaft 12. The clutch disk 38 is formed into a cup shape and thus includes a base wall 42 and a peripheral wall 44. A shaft hole 40, which corresponds to the output shaft 12, is formed through the base wall 42. The peripheral wall 44 extends from an outer peripheral edge of the base wall 42 in the axial direction of the output shaft 12. When the output shaft 12 (more specifically, the relatively rotatable shaft portion 18) is received through the shaft hole 40, the clutch disk 38 is coaxial with the output shaft 12 and also with the input disk 28 and is located on the other axial end side of the output shaft 12 (the clutch base 20 side) with respect to the input disk 28 and is axially movably supported by the output shaft 12 in the axial direction of the output shaft 12.

Fitting female guide portions 46, 48 are provided in an opening side peripheral part of the peripheral wall 44 to correspond with the fitting male portions 24, 26 of the clutch base 20. The fitting male portions 24, 26 of the clutch base 20 are fitted into the fitting female guide portions 46, 48, respectively, of the peripheral wall 44 in the axial direction of the output shaft 12 in a manner that allows relative movement between the fitting male portions 24, 26 of the clutch base 20 and the fitting female guide portions 46, 48 in the axial direction of the output shaft 12. In this way, the clutch disk 38 rotates together with the clutch base 20 (i.e., the output shaft 12) and is movable relative to the clutch base 20 in the axial direction of the output shaft 12.

Two pairs of mating female portions (second side mating portions) 50, 52 are recessed in a back surface of the base wall 42 of the clutch disk 38 (an input disk 28 side, i.e., the one axial end side of the output shaft 12).

The mating female portions 50, 52 correspond to the mating male portions 34, 36, respectively, of the input disk 28. The mating female portions (the mating female portions of the first pair) 50 of one of the two pairs of the mating female portions 50, 52 are opposed to one another in the circumferential direction, i.e., are displaced 180 degrees from one another in the circumferential direction. Also, the mating female portions (the mating female portions of the second pair) 52 of the other one of the two pairs of the mating female portions 50, 52 are opposed to one another in the circumferential direction, i.e., are displaced 180 degrees from one another in the circumferential direction. Furthermore, the mating female portions 50 and the mating female portions 52 are arranged at equal intervals (i.e., 90 degree intervals in the circumferential direction). The mating male portions 34 of the input disk 28 can engage the mating female portions 50 of the clutch disk 38, and the mating male portions 36 of the input disk 28 can engage the mating female portions 52 of the clutch disk 38. In this way, when the input disk 28 is rotated, a rotational force of the input disk 28 is transmitted to the clutch disk 38, so that the clutch disk 38 is rotated together with the input disk 28.

Lateral walls 34a, 36a of the mating male portions 34, 36 of the input disk 28 and lateral walls 50a, 52a of the mating female portions 50, 52 of the clutch disk 38 have slant surfaces. In other words, each of the mating male portions 34, 36 has a trapezoidal cross section, and each of the mating female portions 50, 52 has a corresponding trapezoidal cross section. In this way, when the input disk 28 is rotated, a rotational force is transmitted from the input disk 28 to the clutch disk 38, and thus a force component is generated in the clutch disk 38 in the axial direction of the output shaft 12 toward the clutch base 20.

It should be understood that all of the lateral walls 34a, 36a of the mating male portions 34, 36 of the input disk 28 and the lateral walls 50a, 52a of the mating female portions 50, 52 of the clutch disk 28 do not need to have the slant surfaces described above. For example, only one of the lateral walls 34a, 36a of each of the mating male portions 34, 36 can be made as the slant surface, which is slanted in the circumferential direction or is slanted relative to the circumferential direction. Also, only one of the lateral walls 50a, 52a of each of the mating female portions 50, 52 can be made as the slant surface, which is slanted in the circumferential direction or is slanted relative to the circumferential direction. Even with this structure, the force component can be generated in the clutch disk 38 in the axial direction of the output shaft 12 toward the clutch base 20 upon transmission of the rotational force from the input disk 28 to the clutch disk 38.

Furthermore, an interior of the clutch disk 38, i.e., an inner space defined by the base wall 42 and the peripheral wall 44 forms a receiving portion 54. The clutch base 20 is fitted to the opening side peripheral part of the peripheral wall 44 of the clutch disk 38 in such a manner that the clutch base 20 closes the receiving portion 54.

The receiving portion 54 receives a plurality (two in the present embodiment) of wave washers 56, which serve as resilient members of the present invention. The wave washers 56 are arranged between the clutch disk 38 (the base wall 42) and the clutch base 20. Furthermore, the wave washers 56 apply a predetermined resistive force (a restoring force generated upon resilient deformation of the wave washers 56 due to the axial movement of the clutch disk 38) against the axial movement of the clutch disk 38 toward the other output shaft 12 axial end side (the clutch base 20 side) from the engaged state, at which the mating male portions 34, 36 of the input disk 28 and the mating female portions 50, 52 of the clutch disk 38 are engaged with one another to rotate together.

In other words, in the normal operation, the mating male portions 34, 36 of the input disk 28 are engaged with, i.e., are received in the mating female portions 50, 52 of the clutch disk 38, and the wave washers 56 maintain the engaged state between the mating male portions 34, 36 of the input disk 28 and the mating female portions 50, 52 of the clutch disk 38. When the mating male portions 34, 36 of the input disk 28 try to disengage from the mating female portions 50, 52 of the clutch disk 38, the clutch disk 38 tries to move axially toward the clutch base 20, and the wave washers 56 exert the urging force (the restoring force) against the axial movement of the clutch disk 38.

In the normal operation (i.e., in the state where the clutch disk 38 does not try to move axially toward the clutch base 20), the wave washers 56 may always exert an appropriate urging force between the clutch base 20 and the clutch disk 38. Alternatively, the wave washers 56 may exert the above urging force (the restoring force) only when the clutch disk 38 tries to move toward the clutch base 20, i.e., only when the mating male portions 34, 36 try to disengage from the mating female portions 50, 52.

Operation of the first embodiment will be described.

In the clutch device 10, in the normal operational state, the mating male portions 34 of the input disk 28 are engaged with the mating female portions 50 of the clutch disk 38. When the clutch disk 38 tries to move in the axial direction of the output shaft 12 from the engaged state, in which the mating male portions 34 and the mating female portions 50 are engaged with one another, the predetermined resistive force is applied from the wave washers 56 to the clutch disk 38. Thus, the engaged state is maintained. Furthermore, the fitting male portions 24, 26 of the clutch base 20 are fitted into the fitting female guide portions 46, 48 of the clutch disk 38 in the axial direction of the output shaft 12 in such a manner that the fitting female guide portions 46, 48 of the clutch disk 38 are movable relative to the fitting male portions 24, 26 of the clutch base 20 in the axial direction of the output shaft 12. Thus, when the drive force (e.g., the rotational force of a motor main body) is supplied to the input disk 28, the input disk 28 is rotated about the output shaft 12. At this time, the rotational drive force is transmitted from the input disk 28 to the clutch disk 38 through the mating male portions 34, 36 and the mating female portions 50, 52. Since the clutch disk 38 is engaged with the clutch base 20, which is secured to the output shaft 12, the rotational drive force transmitted to the clutch disk 38 is transmitted from the clutch disk 38 to the clutch base 20. Thus, the clutch disk 38 and the clutch base 20 are rotated together with the output shaft 12.

In the clutch device 10, in the normal operational state (a rotating state), at the time of transmitting the rotational drive force from the input disk 28 of the clutch device 10 to the output shaft 12, the rotational drive force can be transmitted without causing sliding movement of any relevant component. In other words, the resistive force of the wave washers 56, which is applied to the clutch disk 38 to limit axial movement of the clutch disk 38 from the engaged state to maintain the engaged state between the mating male portions 34, 36 of the input disk 28 and the mating female portions 50, 52 of the clutch disk 38, is not wasted as the sliding frictional force. Therefore, a reduction in the transmission efficiency of the rotation can be advantageously limited. Also, since the rotational drive force can be transmitted without causing the sliding movement of the relevant components, generation of a noise, which could be generated upon sliding movement of the relevant components, can be limited.

Furthermore, as described above, the resistive force of the wave washers 56, which is applied to the clutch disk 38 to limit axial movement of the clutch disk 38 from the engaged state to maintain the engaged state between the mating male portions 34, 36 of the input disk 28 and the mating female portions 50, 52 of the clutch disk 38, is supported by the clutch base 20, which is secured to the output shaft 12, and is also supported by the input disk 28, which is supported by the output shaft 12 while being limited from axial removal from the output shaft 12. That is, the force for maintaining the engaged state is supported by the two constituent components, i.e., the clutch base 20 and the input disk 28, which are installed to the output shaft 12. That is, the clutch device 10 is formed as a complete sub-assembly of the output shaft 12, which does not require any additional component, such as a housing, to serve as the sub-assembly. Thus, the clutch device 10 can be handled as the single component, which is formed as the sub-assembly of the output shaft 12.

For example, when an excessively large external force (load), which is equal to or greater than a predetermined value, is applied to the output shaft 12 through the wiper W, the output shaft 12 is reversely rotated or is arrested. Then, the clutch disk 38, which is rotated together with the output shaft 12 (the clutch base 20), receives a rotational force through the clutch base 20 in a direction that causes rotation of the clutch disk 38 relative to the input disk 28. Since the lateral walls 34a, 36a of the mating male portions 34, 36 of the input disk 28 and the lateral walls 50a, 52a of the mating female portions 50, 52 of the clutch disk 38 have the slant surfaces (i.e., having the trapezoidal cross section), the force component is generated in the clutch disk 38 in the axial direction of the output shaft 12 toward the clutch base 20 due to the relative rotational force generated by the relative rotation between the input disk 28 and the clutch disk 38. That is, a portion of the relative rotational force generated by the relative rotation between the input disk 28 and the clutch disk 38 serves as the force component, which moves the clutch disk 38 in the axial direction of the output shaft 12 to release the engagement between the mating male portions 34, 36 of the input disk 28 and the mating female portions 50, 52 of the clutch disk 38. When this relative rotational force (the force component) becomes equal to or greater than a predetermined value, the clutch disk 38 overcomes the resistive force and is thus forcefully moved in the axial direction of the output shaft 12 to release the engagement between the mating male portions 34, 36 of the input disk 28 and the mating female portions 50, 52 of the clutch disk 38. Thus, the clutch disk 38, i.e., the output shaft 12 is rotated relative to the input disk 28.

In this way, it is possible to limit damage to each component. Also, it is possible to limit damage to the component connected to the input disk 28 (e.g., burnout of the motor main body). Furthermore, the strength of each corresponding component can be set without considering the application of such an excessively large external force (load) to that component.

Furthermore, in the clutch device 10, the clutch base 20 is secured integrally to the rotation restraining portion 14 of the output shaft 12, which has the ridges. Particularly, the clutch base 20 is securely connected to the rotation restraining portion 14 of the output shaft 12 in the rotational direction about the axis of the output shaft 12. Axial removal of the input disk 28 from the output shaft 12 is limited by the removal limiting portion 16 of the output shaft 12. Furthermore, the clutch disk 38 is axially movably supported around the relatively rotatable shaft portion 18 of the output shaft 12 between the clutch base 20 and the input disk 28. That is, each of the above components is installed to the output shaft 12, and the clutch disk 38 is arranged in the predetermined space (the predetermined axial dimension) between the clutch base 20 and the input disk 28. Thus, as discussed above, the force (the clutch uncoupling force, i.e., the declutching force) required to axially move the clutch disk 38 can be easily set. Furthermore, in this case, as described above, the lateral walls 34a, 36a of the mating male portions 34, 36 of the input disk 28 and the lateral walls 50a, 52a of the mating female portions 50, 52 of the clutch disk 38 have the slant surfaces, so that the declutching force can be easily set based on the angle of the slant surface and the resistive force (resiliently deforming force) of the wave washers 56.

Furthermore, in the clutch device 10, the resilient members are made of the wave washers 56, and the resistive force, which is applied against the axial movement of the clutch disk 38, is implemented by the restoring force of the wave washers 56, which are resiliently deformed by the axial movement of the clutch disk 38. Thus, at the time of applying the excessively large external force (the load) to the output shaft 12, the clutch disk 38 overcomes the restoring force, which is generated by the resilient deformation of the wave washers 56, and is thus axially moved. Thereby, the engagement between the clutch disk 38 (the mating female portions 50, 52) and the input disk 28 (the mating male portions 34, 36) is released, and thus relative rotation between the clutch disk 38 and the input disk 28 occurs.

When the wave washers 56 are used as the resilient members, the resilient members are not deteriorated by the oil, such as grease. Thus, deterioration of the resilient members can be advantageously limited.

Furthermore, the resistive force, which is applied against the axial movement of the clutch disk 38, is implemented by the restoring force of the wave washers 56, which are resiliently deformed. Thus, the force (the declutching force), which is required to axially move the clutch disk 38, is stabilized, resulting in an improvement in the clutch performance. Furthermore, when the resilient members are made of the wave washers 56, the accommodating space for accommodating the resilient members can be reduced or thinned to allow a reduction in the device size.

Furthermore, in the clutch device 10, the wave washers 56 are received in the receiving portion 54 of the clutch disk 39 of the clutch device 10, and the receiving portion 54 is closed by the clutch base 20. Thus, the wave washers 56 are arranged around the output shaft 12 without positional deviation relative to the clutch base 20 and the clutch disk 38. Therefore, the wave washers 56 can apply the stable urging force (the resiliently deforming force) to both the clutch base 20 and the clutch disk 38.

As described above, in the clutch device 10 of the first embodiment, the damage to the components or the burnout of the motor main body can be limited at the time of locking the output shaft 12. Furthermore, in the normal operational state, the sliding loss is relatively small, and the transmission efficiency of the rotation is relatively high. Thus, generation of a noise is effectively limited. Furthermore, the clutch device 10 is formed as the complete sub-assembly of the output shaft 12, which does not require any additional component. Thus, the clutch device 10 can be handled as the single component.

In the first embodiment, the wave washers 56 are used as the resilient members of the clutch device 10. However, the resilient members of the clutch device 10 are not limited to the wave washers 56.

Figure 3:
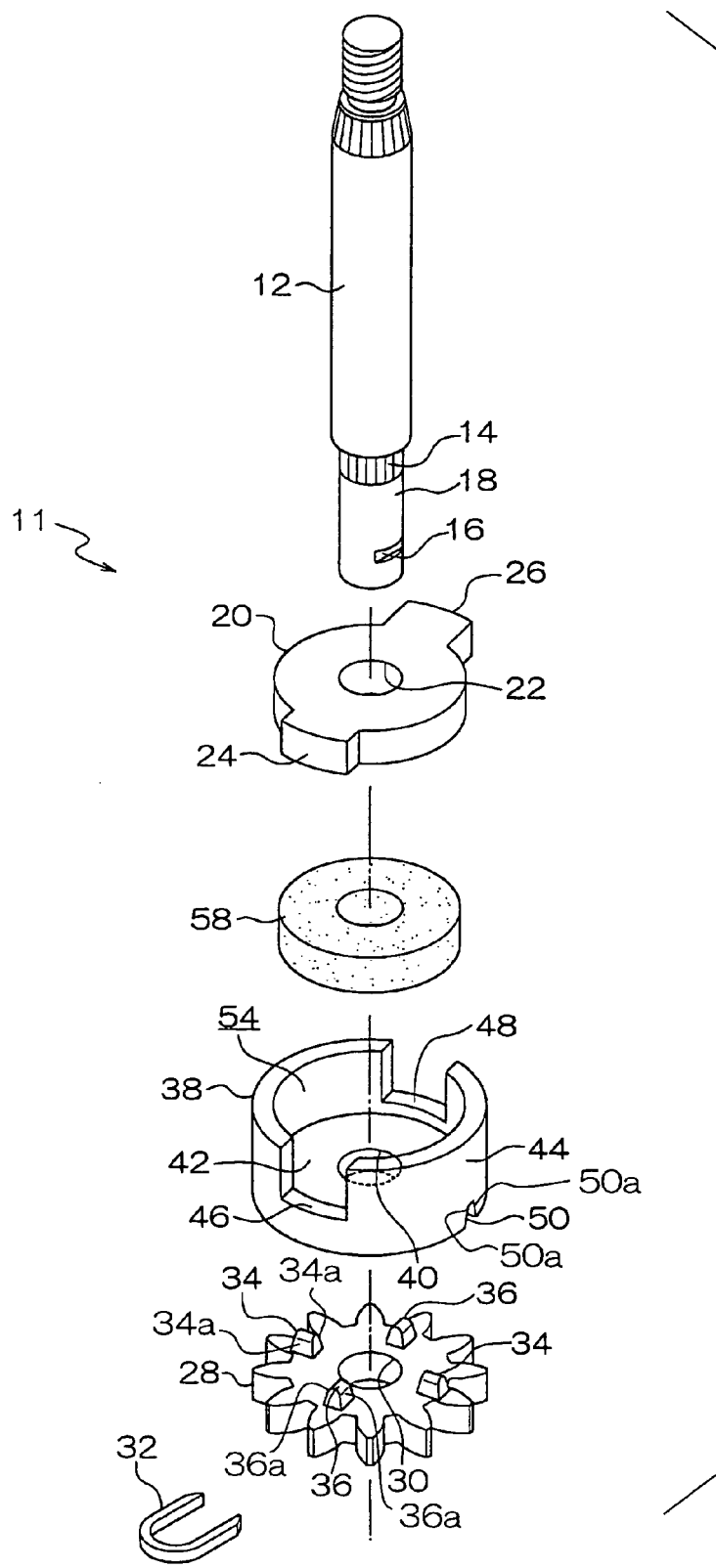
FIG. 3 is an exploded perspective view showing a structure of a modification of the clutch device of the first embodiment of the present invention.

For example, as in a case of a clutch device (serving as an output shaft assembly of the present invention) 11 shown in FIG. 3, a circular disk shaped rubber member 58 may be used as the resilient member. The resistive force, which is applied to the clutch disk 38 to limit the axial movement of the clutch disk 38, can be implemented by the restoring force of the rubber member 58, which is resiliently compressively deformed. In such a case where the rubber member 58 is used as the resilient member, at the time of normal operation (normal use), the rubber member 58, which is not resiliently deformed in the normal operation, serves as a spacer that maintains the engaged state between the clutch disk 38 (the mating female portions 50, 52) and the input disk 28 (the mating male portions 34, 36). Since it is possible to stop application of the urging force for maintaining the engagement between the clutch disk 38 (the mating female portions 50, 52) and the input disk 28 (the mating male portions 34, 36) in the normal operation, effects of long term stress, which is caused by, for example, deformation of the resilient member, can be reduced to limit deterioration of the resilient member.

Furthermore, the resilient member(s) is not limited to the wave washer 56 or the rubber member 58 and can be further alternatively a compression coil spring or a Belleville spring.

Furthermore, in these cases, at the time of the normal state (the state where the clutch disk 38 does not move toward the clutch base 20), each resilient member, such as the rubber member 58, may apply the urging force between the clutch base 20 and the clutch disk 38. Alternatively, each resilient member, such as the rubber member 58, may apply the urging force (the restoring force) against the clutch disk 38 only when the clutch disk 38 is moved toward the clutch base 20, i.e., only when the mating male portions 34, 36 try to move away from the mating female portions 50, 52.

Next, other embodiments will be described. It should be noted that components similar to those of the first embodiment will be indicated by the same numerals throughout the other embodiments and will not be described again for the sake of simplicity.

Second Embodiment

Figure 4:
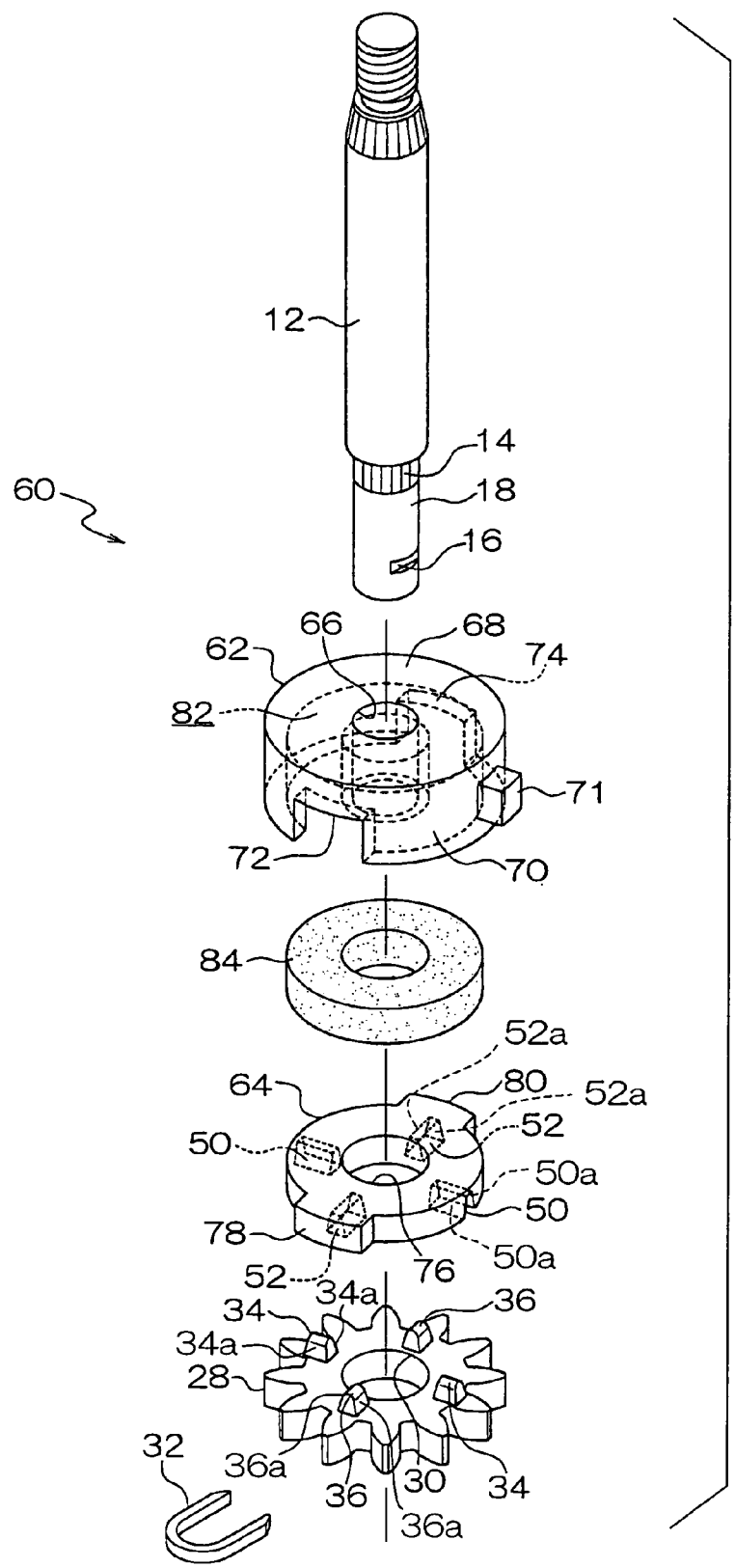
FIG. 4 is an exploded perspective view showing a structure of a clutch device according to a second embodiment of the present invention.
Figure 5:
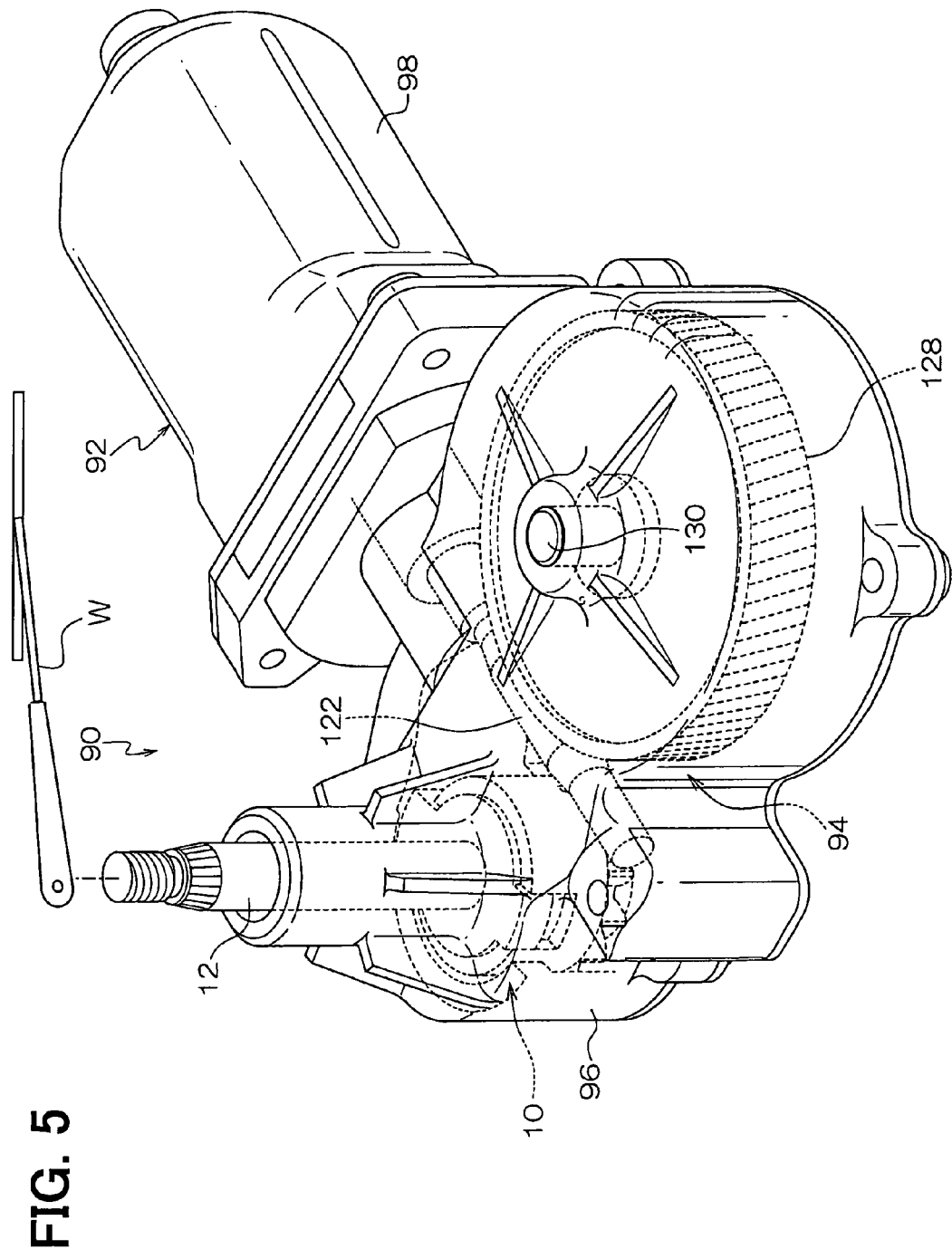
FIG. 5 is a perspective view showing a wiper motor apparatus and a clutch device according to a third embodiment of the present invention.
Figure 6:
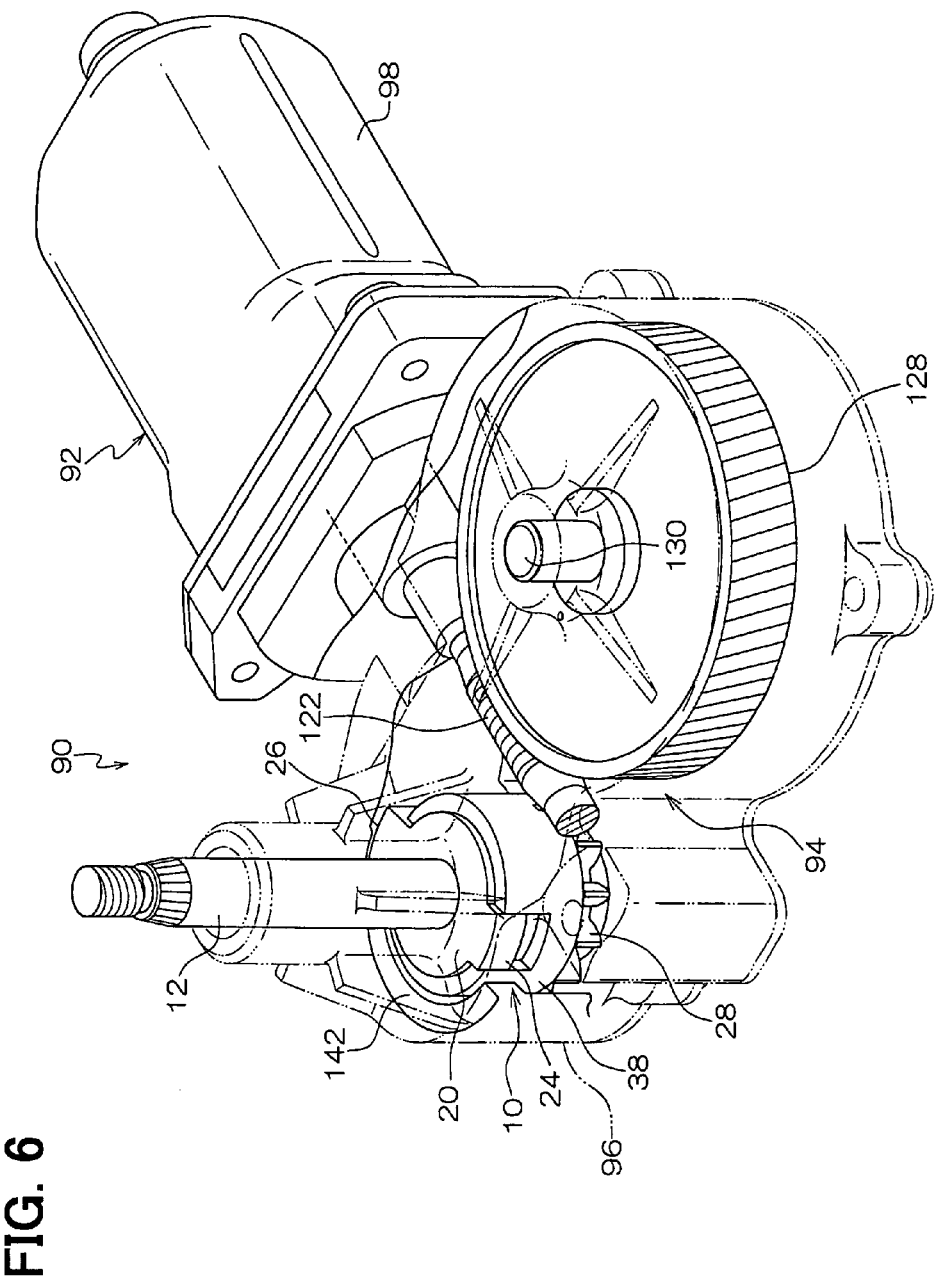
FIG. 6 is a perspective view transilluminating a portion of the wiper motor apparatus and the clutch device of the third embodiment of the present invention.
Figure 7:
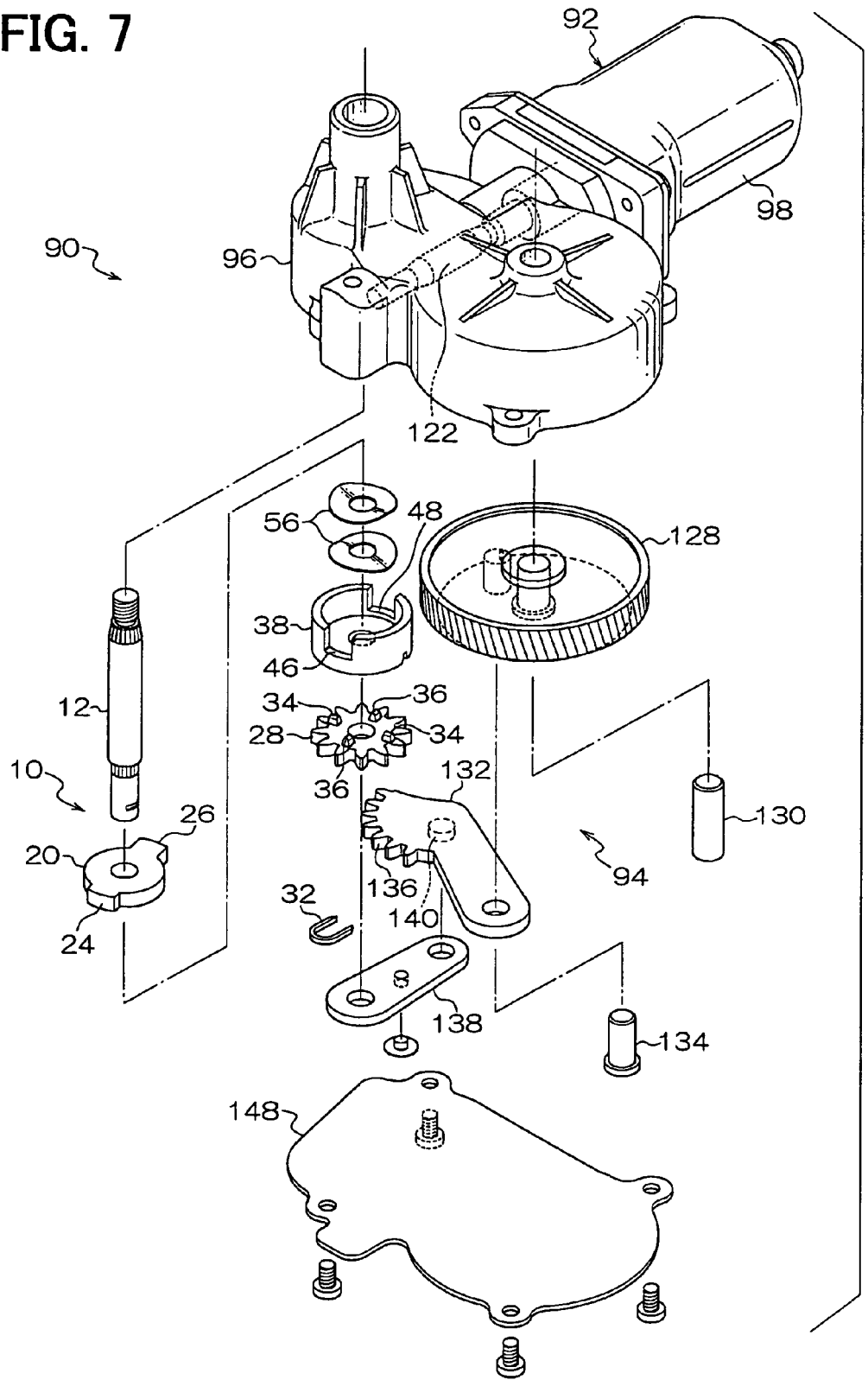
FIG. 7 is an exploded perspective view showing the wiper motor apparatus and the clutch device of the third embodiment of the present invention.

FIG. 4 is a perspective exploded view of a clutch device (serving as an output shaft assembly of the present invention) 60 according to a second embodiment of the present invention.

The clutch device 60 has a structure, which is basically the same as that of the clutch device 10 of the first embodiment. However, the clutch device 60 includes a clutch base 62 in place of the clutch base 20 and also includes a clutch disk (the second rotatable member) 64 in place of the clutch disk 38.

The clutch base 62 is formed into a cup shape and includes a base wall 68 and a peripheral wall 70. A support hole 66, which corresponds to the output shaft 12, is formed through the base wall 68. The peripheral wall 70 extends from a peripheral edge of the base wall 68 in the axial direction of the output shaft 12. The support hole 66 is secured to the rotation restraining portion 14 of the output shaft 12, so that the clutch base 62 rotates integrally with the output shaft 12. Fitting female guide portions 72, 74 are provided in an opening side peripheral part of the peripheral wall 70.

The clutch disk 64 is formed as a circular disk shaped body and has a shaft hole 76 that corresponds to the output shaft 12. The output shaft 12 (the relatively rotatable shaft portion 18) is received through the shaft hole 76 of the clutch disk 64. The clutch disk 64 is located on the other axial end side of the output shaft 12 (the clutch base 62 side) with respect to the input disk 28 and is supported by the output shaft 12 in such a manner that the clutch disk 64 is movable relative to the output shaft 12 in the axial direction of the output shaft 12. Furthermore, a pair of fitting male portions 78, 80 is provided to correspond with the fitting female guide portions 72, 74 of the clutch base 62 in an outer peripheral part of the clutch disk 64. The fitting male portions 78, 80 are opposed to one another in a circumferential direction of the clutch disk 64, i.e., are displaced 180 degrees from one another in the circumferential direction of the clutch disk 64 and protrude in a radial direction of the output shaft 12. The fitting male portions 78, 80 of the clutch disk 64 are axially moved and are fitted into the fitting female guide portions 72, 74 of the clutch base 62. In this way, the clutch disk 64 is rotated together with the clutch base 62 (i.e., the output shaft 12) and is axially movable relative to the clutch base 62 in the axial direction of the output shaft 12.

Furthermore, similar to the first embodiment, two pairs of mating female portions 50, 52 are recessed in a back surface of the clutch disk 64 (an input disk 28 side, i.e., the one axial end side of the output shaft 12).

Furthermore, an interior of the clutch base 62, i.e., an internal space defined by the base wall 68 and the peripheral wall 70 forms a receiving portion 82. The clutch disk 64 is fitted to the opening side peripheral part of the peripheral wall 70 of the clutch base 62 in such a manner that the clutch disk 64 closes the receiving portion 82.

The receiving portion 82 receives a rubber member 84, which serves as the resilient member. The rubber member 84 is arranged between the clutch base 62 (the base wall 68) and the clutch disk 64. The rubber member 84 applies a predetermined resistive force (a restoring force generated at the time of resiliently compressive deformation of the rubber member 84 caused by axial movement of the clutch disk 64) against the axial movement of the clutch disk 64 toward the other output shaft 12 axial end side (toward the clutch base 62 side) from the engaged state, in which the mating male portions 34, 36 of the input disk 28 and the mating female portions 50, 52 of the clutch disk 64 are engaged with one another.

The other components are the same as those of the clutch device 10 of the first embodiment.

Next, operation of the second embodiment will be described.

The clutch device 60 provides the advantages similar to those of the clutch device 10 of the first embodiment.

More specifically, in the normal operational state, when the drive force is supplied to the input disk 28 to rotate the input disk 28 about the output shaft 12, the rotational drive force is transmitted from the input disk 28 to the clutch disk 64 through the mating male portions 34, 36 and the mating female portions 50, 52. Since the clutch disk 64 is engaged with the clutch base 62, which is secured to the output shaft 12, the rotational drive force transmitted to the clutch disk 64 is transmitted from the clutch disk 64 to the clutch base 62. Thus, the output shaft 12 is rotated together with the clutch disk 64 and the clutch base 62.

Here, even in the case of the clutch device 60, in the normal operational state (the rotating state), as discussed above, at the time of transmitting the rotational drive force from the input disk 28 to the output shaft 12, the rotational drive force can be transmitted without causing sliding movement of any relevant components. More specifically, the resistive force of the rubber member 84, which is applied against the axial movement of the clutch disk 64 from the engaged state of the clutch disk 64 to maintain the engaged state between the mating male portions 34, 36 of the input disk 28 and the mating female portions 50, 52 of the clutch disk 64, is not wasted as the sliding frictional force. Thus, it is possible to limit a reduction in the transmission efficiency of the rotation. Furthermore, the rotational drive force can be transmitted without causing sliding movement of any relevant components. Thus, generation of a noise, which would be generated by the sliding movement of the relevant components, can be advantageously limited.

Furthermore, as discussed above, the resistive force of the rubber member 84, which is applied against the axial movement of the clutch disk 64 from the engaged state to maintain the engagement between the mating male portions 34, 36 and the mating female portions 50, 52, is received by the clutch base 62, which is secured to the output shaft 12, and is also received by the input disk 28, which is supported by the output shaft 12 in a manner that limits axial removal of the input disk 28 from the output shaft 12. That is, the force for maintaining the engaged state is supported by the two constituent components, i.e., the clutch base 62 and the input disk 28, which are installed to the output shaft 12. In other words, the clutch device 60 is formed as a complete sub-assembly of the output shaft 12, which does not require any additional component, such as a housing, to serve as the sub-assembly. Thus, the clutch device 60 can be handled as the single component, which is formed as the sub-assembly of the output shaft 12.

For example, when an excessively large external force (load) is applied to the output shaft 12, the output shaft 12 is reversely rotated or is arrested. Then, the clutch disk 64, which is rotated together with the output shaft 12 (the clutch base 62), receives a rotational force through the clutch base 62 to rotate the clutch disk 64 relative to the input disk 28. Since the lateral walls 34a, 36a of the mating male portions 34, 36 of the input disk 28 and the lateral walls 50a, 52a of the mating female portions 50, 52 of the clutch disk 64 have the slant surfaces (i.e., having the trapezoidal cross section), the force component is generated in the clutch disk 64 in the axial direction of the output shaft 12 toward the clutch base 62 due to the relative rotational force generated by the relative rotation between the input disk 28 and the clutch disk 64. When this relative rotational force (the force component) becomes equal to or greater than a predetermined value, the clutch disk 64 overcomes the resistive force applied from the rubber member 84 and is forcefully moved in the axial direction of the output shaft 12 to release the engagement (i.e., releasing the engagement by moving the mating male portions 34, 36 away from the mating female portions 50, 52 of the clutch disk 64). Thus, relative rotation between the clutch disk 64, i.e., the output shaft 12 and the input disk 28 occurs.

In this way, it is possible to limit damage to each component or burnout of the motor main body, which is connected to the input disk 28. Furthermore, it is not required to set the strength of each corresponding component upon consideration of the application of such an excessively large external force (load).

As discussed above, the clutch device 60 of the second embodiment provides the advantages similar to those of the clutch device 10 of the first embodiment. Thus, the damage to the components or the burnout of the motor main body can be limited at the time of locking the output shaft 12. Furthermore, in the normal operational state, the sliding loss is relatively small, and the transmission efficiency of the rotation is relatively high. Thus, generation of a noise is effectively limited. Furthermore, the clutch device 60 is formed as the complete sub-assembly of the output shaft 12, which does not require any additional component. Thus, the clutch device 10 can be handled as the single component.

Third Embodiment

With reference to FIGS. 5 to 14, a wiper motor apparatus 90 of the third embodiment will be described.

The wiper motor apparatus 90 is formed to drive the wiper system (the wiper W) of the vehicle and includes a motor main body 92, a motion converting mechanism (also referred to as a swing mechanism) 94 and the clutch device 10.

The clutch device 10 of the first embodiment is used as the clutch device 10 of the present embodiment. The clutch device 10 is received in a housing 96, and the output shaft 12 projects outwardly from the housing 96.

A yoke housing 98 of the motor main body 92 is formed as a flat type cup shaped cylindrical housing, which has one axial end formed by a drawing process and which has a predetermined cross section that extends in a direction perpendicular to the axis of the rotatable shaft 110. A transverse direction of the predetermined cross section of the flat type cup shaped cylindrical housing coincides with the axial direction of the output shaft 12. The opening of the yoke housing 98 is integrally connected to the housing 96. A bearing 102 is arranged in a base wall 100 of the yoke housing 98. A dielectric resin end housing 104 is secured to the other end of the yoke housing 98.

A bearing 106 is arranged in the center of the end housing 104. The rotatable shaft 110 of the armature 108 is supported by the bearing 106 of the end housing 104 and the bearing 102 of the yoke housing 98, and the armature 108 is received in the yoke housing 98. Magnets 112 are secured to an inner peripheral wall of the yoke housing 98, which is opposed to the armature 108.

Brushes 114 are held by brush cases, respectively, in the end housing 104. Each brush 114 is formed as a generally square rod and is urged against a commutator 116 of the armature 108. A connecting pigtail 118 extends from each brush 114, and a distal end of the pigtail 118 is connected to a corresponding power supply connective line.

The rotatable shaft 110 of the motor main body 92 (the armature 108) is connected to a worm gear 122 of the motion converting mechanism 94 through a coupling 120.

One end of the worm gear 122 is rotatably supported by the housing 96 through a bearing 124. The other end of the worm gear 122 is rotatably supported by the housing 96 through a bearing 126. The worm gear 122 is meshed with a worm wheel 128.

The worm wheel 128 is meshed with the worm gear 122 and is received in the housing 96. The worm wheel 128 rotates about a rotatable shaft 130, which extends in a direction perpendicular to the axis of the worm gear 122 (the rotatable shaft 110).

Figure 11:
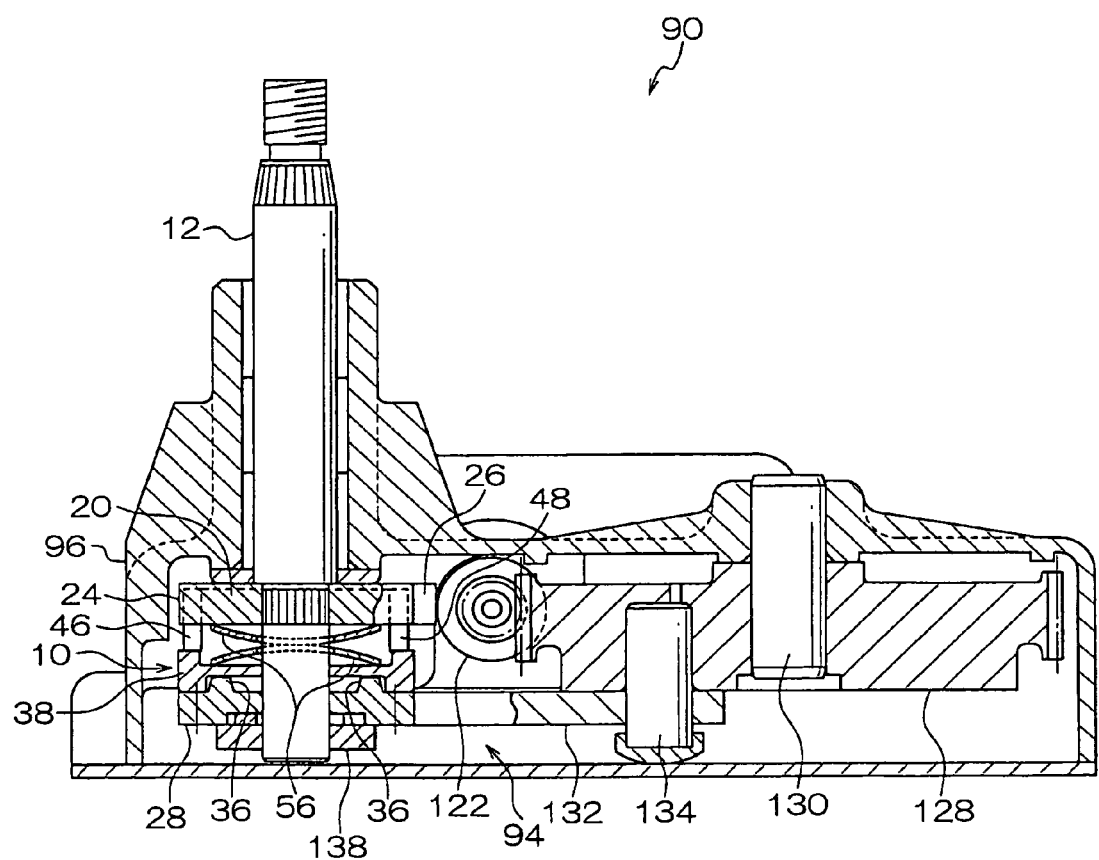
FIG. 11 is a cross sectional view along line XI-XI in FIG. 10, showing the structure of the wiper motor apparatus of the third embodiment of the present invention.
Figure 12:
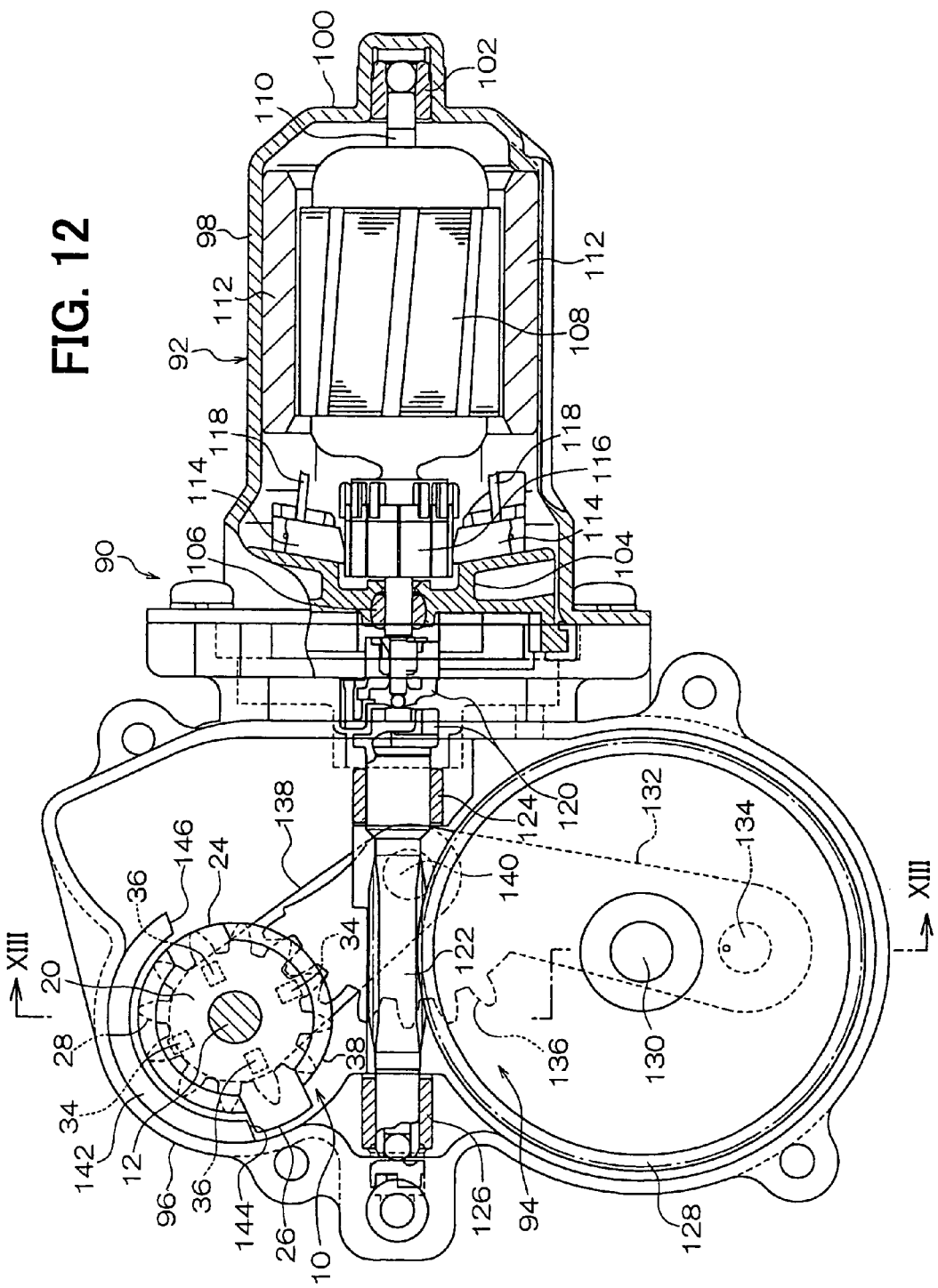
FIG. 12 is a plan cross sectional view showing the structure of the wiper motor apparatus of the third embodiment of the present invention.

A sector gear 132, which serves as a swing member, is connected to the worm wheel 128. As shown in FIGS. 11 and 12, one end of the sector gear 132 is rotatably supported by a support shaft 134. The support shaft 134 is provided to a corresponding point of the worm wheel 128, which is different from that of the rotatable shaft 130, i.e., which is radially displaced from the rotatable shaft 130. A toothed portion 136 is formed in the other end of the sector gear 132 and is meshed with the input disk 28 of the clutch device 10. One end of a holding lever 138 is connected to the sector gear 132 through a support shaft 140. The other end of the holding lever 138 is rotatably connected to the rotational center of the input disk 28, i.e., to the output shaft 12. In this way, a shaft-to-shaft pitch between the support shaft 140 and the output shaft 12 is maintained, and the meshed state between the sector gear 132 and the input disk 28 is maintained. Therefore, when the worm wheel 128 is rotated, the sector gear 132 is swung to reciprocate the input disk 28.

The clutch device 10 of the present embodiment is the clutch device 10 of the first embodiment, as discussed above. In the present embodiment, a stopper projection 142 is formed in the housing 96 to correspond with the fitting male portion 26, which projects longer in the radial direction in comparison to the fitting male portion 24 in the clutch base 20 of the clutch device 10.

The stopper projection 142 is formed as an arcuate body and is located in a rotational moving path of the fitting male portion 26, along which the fitting male portion 26 moves during the rotation of the clutch base 20. One circumferential end of the stopper projection 142 forms a rotation limiter 144, and the other circumferential end of the stopper projection 142 forms a rotation limiter 146. That is, each of the rotation limiters 144, 146 of the stopper projection 142 can engage the fitting male portion 26. When the fitting male portion 26 engages the rotation limiter 144 or the rotation limiter 146 of the stopper projection 142, further rotation of the clutch base 20 is limited. Thus, at the time of rotating the clutch base 20 (the output shaft 12) together with the clutch disk 38 through application of the rotational drive force of the input disk 28 to the clutch base 20, when the fitting male portion 26 engages the rotation limiter 144 or the rotation limiter 146 of the stopper projection 142, the further rotation of the clutch base 20 (the output shaft 12) is forcefully limited. Thus, relative rotation between the input disk 28 and the clutch base 20 (the output shaft 12) occurs.

Furthermore, as discussed above, when the mating male portions 34, 36 of the input disk 28 are received in, i.e., are engaged with the mating female portions 50, 52 of the clutch disk 38, the rotational force is transmitted from the input disk 28 to the clutch disk 38. Also, even in the disengaged state where the mating male portions 34, 36 of the input disk 28 are disengaged from the mating female portions 50, 52 of the clutch disk 38, i.e., in the state where the clutch disk 38 is axially displaced toward the clutch base 20 from the engaged position (a first axial position) to the disengaged position (a second axial position), a predetermined frictional force is generated between the mating male portions 34, 36 of the input disk 28 and the base wall 42 of the clutch disk 38 due to the urging force (the restoring force) of the wave washers 56 to rotate the clutch disk 38 together with the input disk 28. During this rotation, the clutch disk 38 is coupled with the input disk 28 at a reduced rotational coupling force, which is smaller than the maximum coupling force that is achieved through the engagement between the mating male portions 34, 36, of the input disk 28 and the mating female portions 50, 52 of the clutch disk 38. The frictional force of the wave washers 56 is set to achieve this rotation of the clutch disk 38 together with the input disk 28 at the reduced rotational coupling force even in the above disengaged state of the mating male portions 34, 36 and the mating female portions 50, 52.

A rear surface side of the housing 96, in which the clutch device 10 and the motion converting mechanism 94 are received, is closed by a cover plate 148.

Furthermore, the wiper W is directly or indirectly connected to the output shaft 12, which is reciprocally rotated by the input disk 28. In the case where the wiper W is indirectly connected to the output shaft 12, the wiper w may be connected to the output shaft 12 through, for example, a link or a rod. The wiper W is reciprocally rotated through reciprocal rotation of the output shaft 12.

Next, operation of the third embodiment will be described.

In the above wiper motor apparatus 90, when the motor main body 92 (the armature 108) is rotated, the rotational force is transmitted to the worm wheel 128 through the worm gear 122 to rotate the worm wheel 128. When the worm wheel 128 is rotated, the sector gear 132, which is connected to the worm wheel 128, is swung. The swing motion of the sector gear 132 causes reciprocal rotation of the input disk 28.

Figure 8:
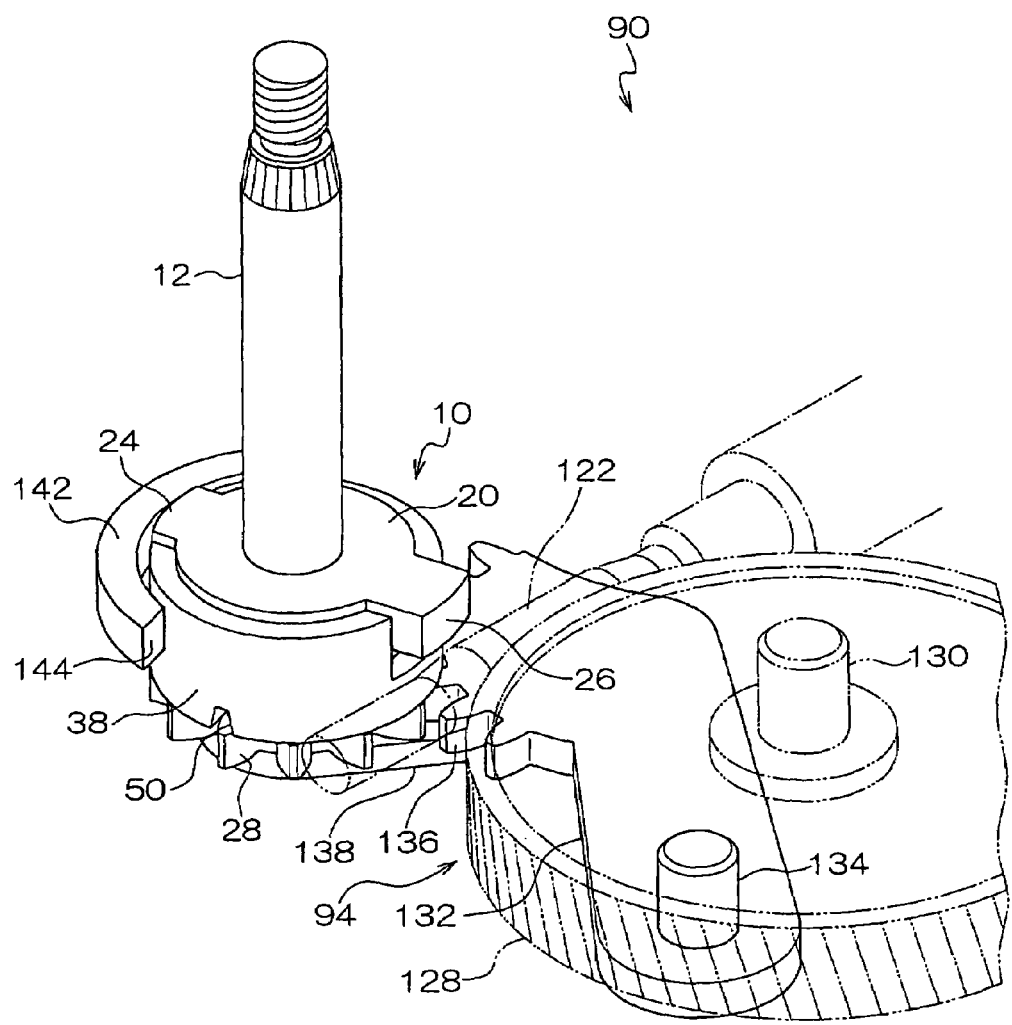
FIG. 8 is a perspective view showing a structure of a main part of the wiper motor apparatus and of the clutch device of the third embodiment of the present invention.
Figure 13:
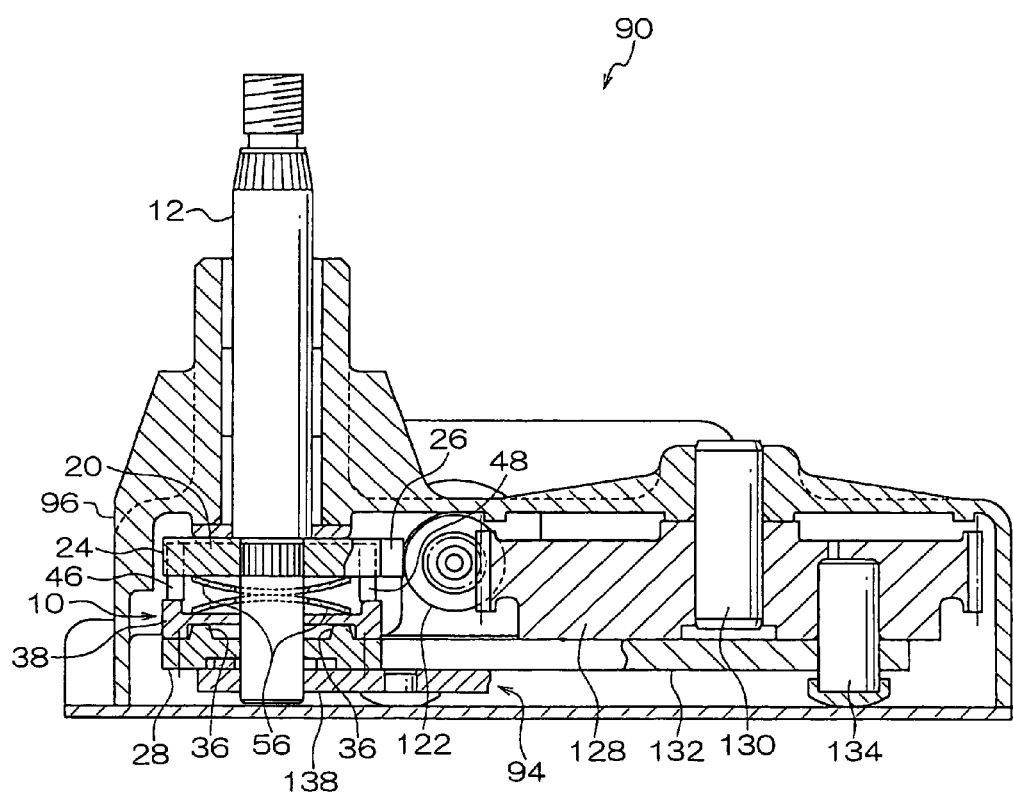
FIG. 13 is a cross sectional view along line XIII-XIII in FIG. 12, showing the structure of the wiper motor apparatus of the third embodiment of the present invention.

In the normal operational state, as discussed with reference to the first embodiment, the mating male portions 34, 36 of the input disk 28 of the clutch device 10 are engaged with, i.e., are fitted to the mating female portions 50, 52, respectively, of the clutch disk 38. Thus, the clutch disk 38 is coupled with the input disk 28 at the maximum rotational coupling force to rotate integrally with the input disk 28 without making relative rotation between the input disk 28 and the clutch disk 38. In this state, even when the clutch disk 38 tries to move to release the engagement between the mating male portions 34, 36 and the mating female portions 50, 52, the predetermined resistive force is applied from the wave washers 56 to the clutch disk 38. Thus, the engagement between the mating male portions 34, 36 and the mating female portions 50, 52 is maintained. The fitting male portions 24, 26 of the clutch base 20 are fitted into the fitting female guide portions 46, 48, respectively, of the clutch disk 38 in a manner that allows relative axial movement between the fitting male portions 24, 26 of the clutch base 20 and the fitting female guide portions 46, 48 of the clutch disk 38 in the axial direction of the output shaft 12. Thus, as shown in FIGS. 8, 11 and 13, the clutch device 10 is placed in a coupled state. In the coupled state, when the input disk 28 is reciprocally rotated, the rotational drive force is transmitted from the input disk 28 to the clutch disk 38 through the mating male portions 34, 36 and the mating female portions 50, 52. Since the clutch disk 38 is engaged with the clutch base 20, which is secured to the output shaft 12, the rotational drive force, which is transmitted to the clutch disk 38, is transmitted from the clutch disk 38 to the clutch base 20. Therefore, the output shaft 12 is rotated together with the clutch disk 38 and the clutch base 20.

In this way, the wiper W, which is connected to the output shaft 12, is reciprocally swung upon reciprocal rotation of the output shaft 12.

In the wiper motor apparatus 90, in the normal operational state (a rotating state), at the time of transmitting the rotational drive force from the input disk 28 of the clutch device 10 to the output shaft 12, the rotational drive force can be transmitted without causing sliding movement of any relevant component. In other words, the resistive force of the wave washers 56, which is applied to the clutch disk 38 to limit axial movement of the clutch disk 38 from the engaged state to maintain the engaged state between the mating male portions 34, 36 of the input disk 28 and the mating female portions 50, 52 of the clutch disk 38, is not wasted as the sliding frictional force. Therefore, a reduction in the transmission efficiency of the rotation can be advantageously limited. Also, since the rotational drive force can be transmitted without causing the sliding movement of the relevant components, generation of a noise, which could be generated upon sliding movement of the relevant components, can be limited.

Figure 9:
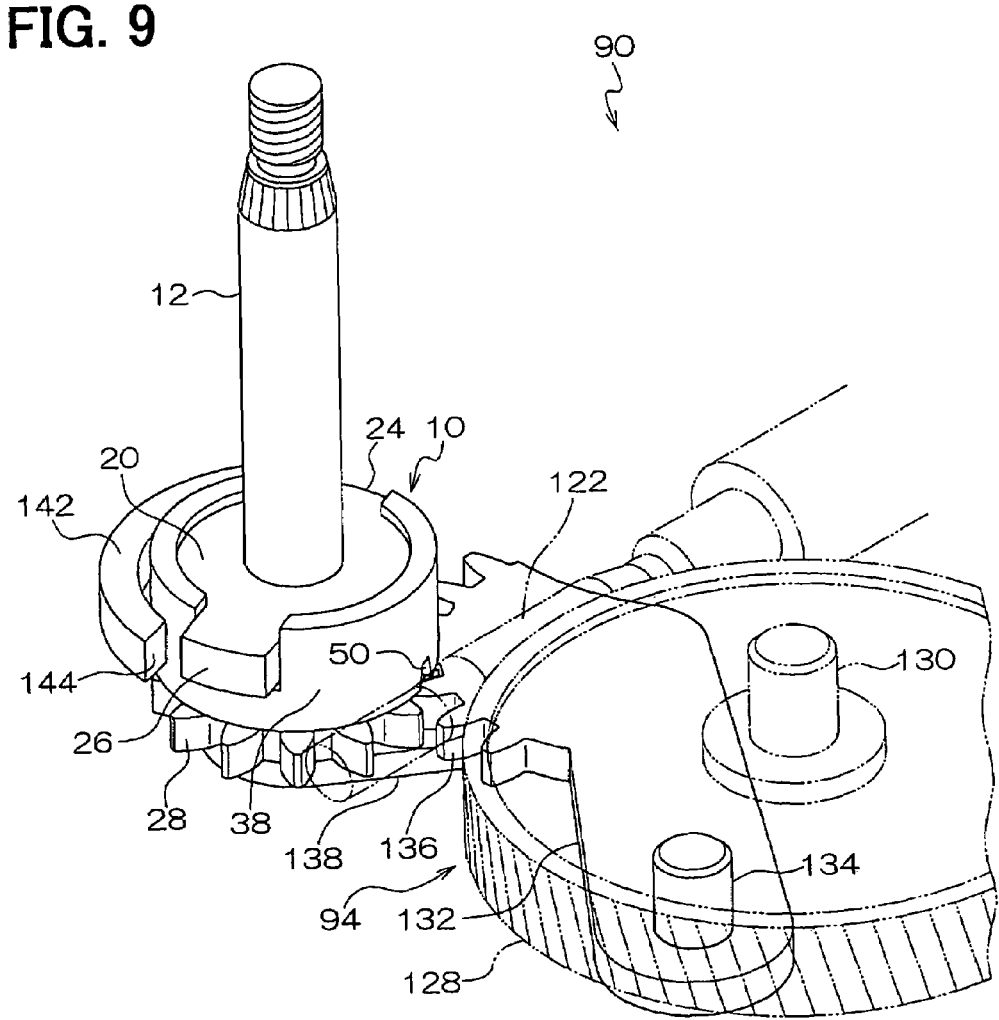
FIG. 9 is a perspective view showing the structure of the main part of the wiper motor apparatus and of the clutch device of the third embodiment and corresponding to FIG. 8 in the declutched state.
Figure 10:
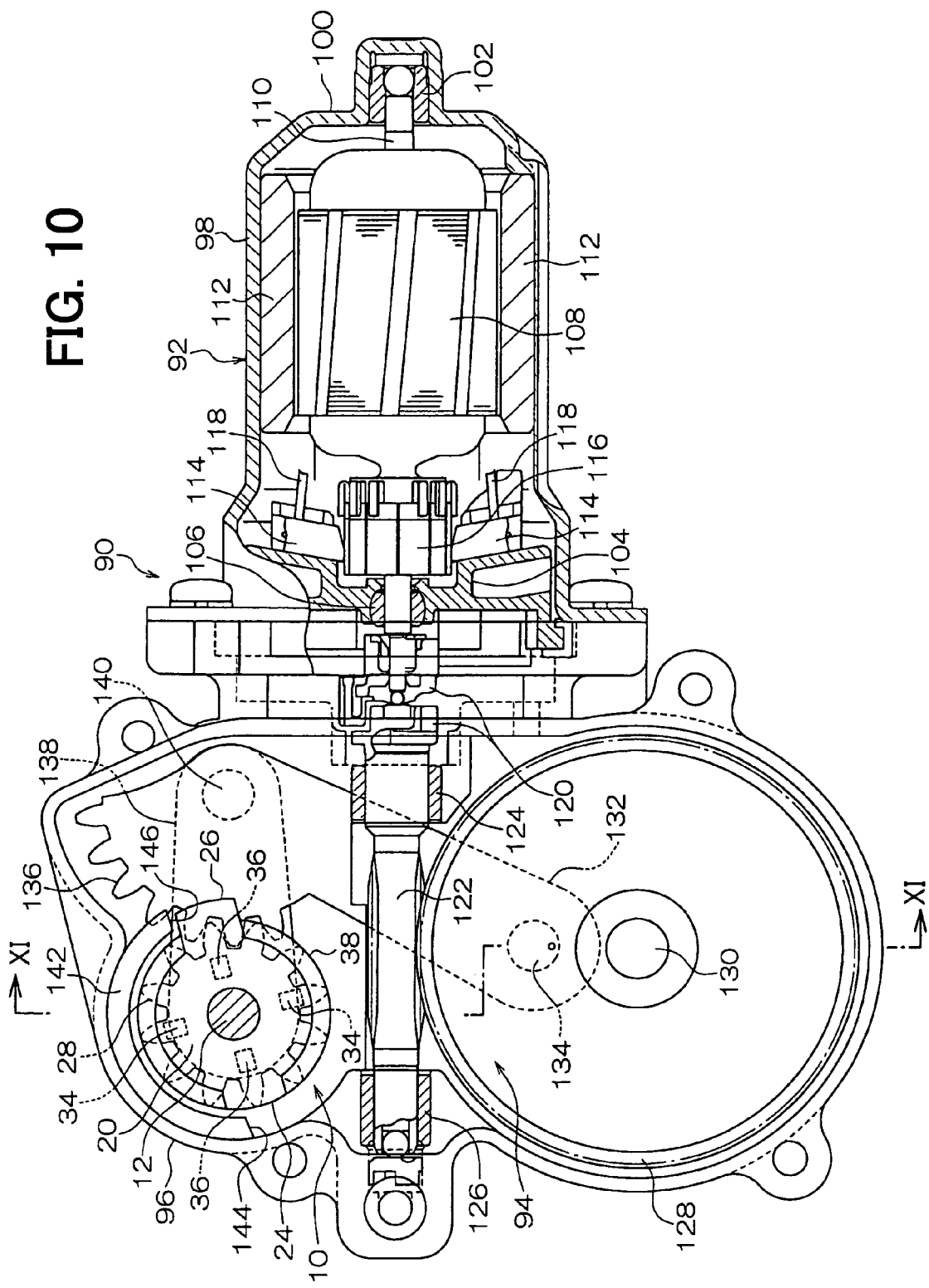
FIG. 10 is a plan cross sectional view showing a structure of the wiper motor apparatus of the third embodiment of the present invention.
Figure 14:
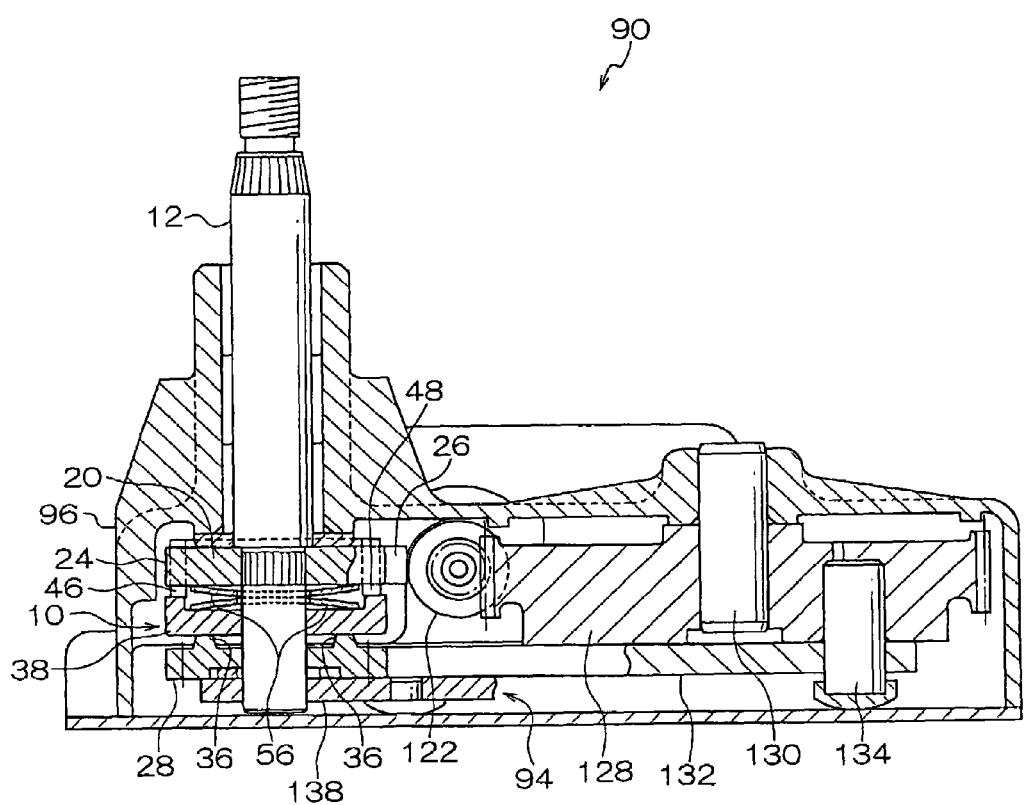
FIG. 14 is a cross sectional view showing the structure of the wiper motor apparatus of the third embodiment of the present invention and corresponding to FIG. 13 in a declutched state.

For example, when an excessively large external force (load), which is equal to or greater than a predetermined value, is applied to the output shaft 12 through the wiper W, the output shaft 12 is reversely rotated or is arrested. Then, the clutch disk 38, which is rotated together with the output shaft 12 (the clutch base 20), receives a rotational force through the clutch base 20 in a direction that causes rotation of the clutch disk 38 relative to the input disk 28. Since the lateral walls 34a, 36a of the mating male portions 34, 36 of the input disk 28 and the lateral walls 50a, 52a of the mating female portions 50, 52 of the clutch disk 38 have the slant surfaces (i.e., having the trapezoidal cross section), the force component is generated in the clutch disk 38 in the axial direction of the output shaft 12 toward the clutch base 20 due to the relative rotational force generated by the relative rotation between the input disk 28 and the clutch disk 38. That is, a portion of the relative rotational force generated by the relative rotation between the input disk 28 and the clutch disk 38 serves as the force component, which moves the clutch disk 38 in the axial direction of the output shaft 12 to release the engagement between the mating male portions 34, 36 of the input disk 28 and the mating female portions 50, 52 of the clutch disk 38. When this relative rotational force (the force component) becomes equal to or greater than a predetermined value, the clutch disk 38 overcomes the resistive force and is thus forcefully moved in the axial direction of the output shaft 12 to release the engagement between the mating male portions 34, 36 of the input disk 28 and the mating female portions 50, 52 of the clutch disk 38. That is, as shown in FIGS. 9 and 14, the clutch device 10 is placed in an uncoupled state, i.e., in a declutched state. Thus, the clutch disk 38, i.e., the output shaft 12 is rotated relative to the input disk 28.

In this way, it is possible to limit damage to each component of the clutch device 10, damage to each component (such as the sector gear 132 or the holding lever 138 connected to the input disk 28) of the motion converting mechanism 94 or burnout of the motor main body 92. Furthermore, the strength of each corresponding component can be set without considering the application of such an excessively large external force (load) to that component.

As discussed above, in the wiper motor apparatus 90 of the third embodiment, the advantages similar to those of the first embodiment are achieved. Thus, it is possible to protect the drive force transmitting components (the components, such as the sector gear 132, the worm wheel 128, the worm gear 122 and the motor main body 92, which are located between the output shaft 12 and the armature 108), which are located after the output shaft 12. Furthermore, it is possible to limit the burnout of the motor main body 92. Also, the wiper, which is connected to the output shaft 12, can be protected since the declutching of the clutch device 10 causes absorption of shocks applied to the wiper W.

Furthermore, in the normal operation, the sliding loss is relatively small, and the transmission efficiency of the rotation is relatively high. Thus, generation of a noise is effectively limited. Also, the input disk 28 is reciprocally rotated at the decelerated speed through the motion converting mechanism 94 (the worm gear 122, the worm wheel 128 and the sector gear 132). Thus, the output shaft 12 can be driven by the relatively large torque. Therefore, the wiper W, which is connected to the output shaft 12, can be appropriately reciprocally driven.

Therefore, the wiper motor apparatus 90 is also suitable as a rear wiper motor apparatus for wiping a rear window of the vehicle or is also suitable as a wiper motor apparatus of a vehicle, such as a truck or a constructor having a cab-over type cockpit, which will likely have an excessively large force (load) on the output shaft 12 through the wiper W at the time of, for example, application of heavy snow, which is accumulated on a roof of the vehicle, to the wiper arm upon vertical falling of the heavy snow along the glass surface.

In the third embodiment, the wiper motor apparatus 90 includes the clutch device 10 of the first embodiment. However, the present invention is not limited to this. For example, the clutch device 60 of the second embodiment can be used as the clutch device of the wiper motor apparatus 90.

Even in this case, the advantages similar to those discussed above with reference to the wiper motor apparatus 90 can be achieved. Furthermore, in the case where the clutch device 60 of the second embodiment shown in FIG. 4 is used in the wiper motor apparatus 90, a projection 71 (FIG. 4), which engages the rotation limiter 144 or 146 of the stopper projection 142, may be formed in the peripheral wall 70 of the clutch base 62. In this way, the rotation of the clutch base 62 (the output shaft 12) can be limited within the predetermined range.

Fourth Embodiment

Figure 15:
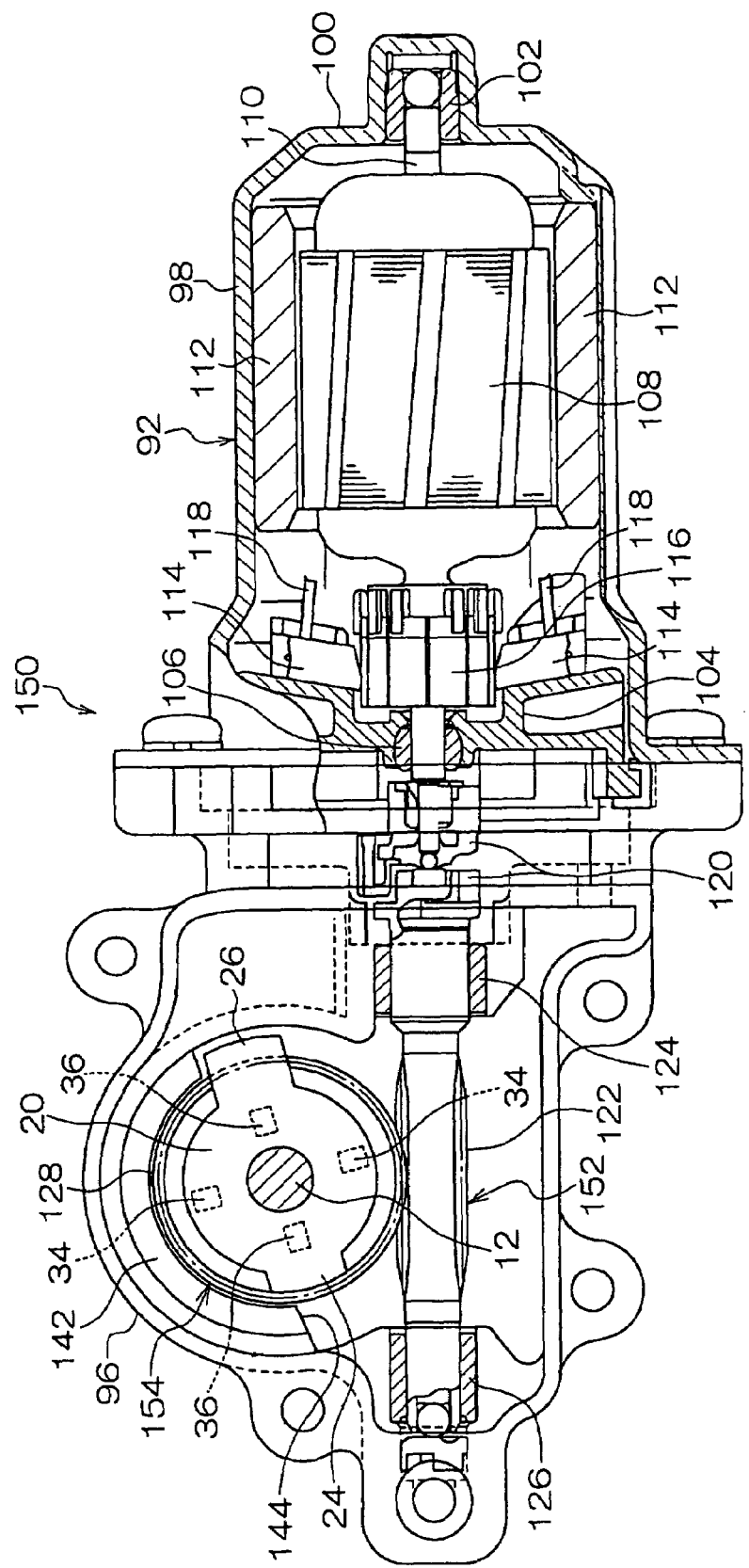
FIG. 15 is a plan view showing a structure of a motor apparatus according to a fourth embodiment of the present invention.

FIG. 15 is a cross sectional view of a motor apparatus 150 according to a fourth embodiment of the present invention.

The motor apparatus 150 has a structure, which is basically the same as that of the wiper motor apparatus 90 of the first embodiment. The motor apparatus 150 includes a motor main body 92, a motion converting mechanism 152 and a clutch device (serving as an output shaft assembly of the present invention) 154.

The motor main body 92 has the structure, which is substantially the same as that of the motor main body 92 of the third embodiment. In the third embodiment, the motor main body 92 (the armature 108) is rotated in the single direction. In contrast, in the present embodiment, the motor main body 92 is rotated in the normal direction and in the reverse direction between the rotation limiters 144, 146 of the stopper projection 142.

In the motion converting mechanism 152, the sector gear 132 and the holding lever 138 of the first embodiment are eliminated. Thus, the motor converting mechanism 152 includes the worm gear 122 and the worm wheel 128.

Furthermore, the worm wheel 128 also serves as an input disk of the clutch device 154. That is, the worm wheel 128 functions as the input disk (or the first rotatable member) of the clutch device 154. In other words, the clutch device 154 has the structure, which is basically the same as that of the clutch device 10 of the first embodiment or of the third embodiment. However, the clutch device 154 is constructed in such a manner that the input disk 28 of the first embodiment is provided with the worm teeth, which are meshed with the worm gear 122.

In this motor apparatus 150, when the motor main body 92 (the armature 108) is rotated, the rotational force is transmitted to the worm wheel 128 through the worm gear 122 to rotate the worm wheel 128.

Here, the worm wheel 128 serves as the input disk (or the first rotatable member) of the clutch device 154, i.e., the worm wheel 128 functions as the input disk (or the first rotatable member) of the clutch device 154. Thus, in the normal operation, as discussed with reference to the third embodiment, the output shaft 12 is rotated integrally with the worm wheel 128.

Even in this motor apparatus 150, at the time of transmitting the rotational drive force in the clutch device 154 in the normal operational state (the rotating state), the rotational drive force can be transmitted without causing sliding movement of any relevant components. Thus, a reduction in the transmission efficiency of the rotation can be limited. Furthermore, since the rotational drive force can be transmitted without causing the sliding movement of any relevant components, generation of a noise, which would be caused by the sliding movement of the relevant components, can be advantageously limited.

For example, when an excessively large external force (load) is applied to the output shaft 12, the output shaft 12 is reversely rotated or is arrested. Then, as discussed in the third embodiment, relative rotation occurs between the output shaft 12 and the worm wheel 128. In this way, it is possible to limit damage to each component of the clutch device 154, damage to each component of the motion converting mechanism 152, such as the worm gear 122 connected to the worm wheel 128, and burnout of the motor main body 92. Furthermore, it is not required to set the strength of each corresponding component upon consideration of the application of such an excessively large external force (load) to that component.

As discussed above, in the motor apparatus 150 of the fourth embodiment, advantages similar to those of the clutch device 10 of the first embodiment or those of the wiper motor apparatus 90 of the third embodiment are achieved. Thus, it is possible to protect the drive force transmitting components (the components, such as the worm wheel 128, the worm gear 122 and the motor main body 92, which are located between the output shaft 12 and the armature 108), which are located after the output shaft 12. Furthermore, it is possible to limit the burnout of the motor main body 92.

Furthermore, in the normal operational state, the sliding loss is relatively small, and the transmission efficiency of the rotation is relatively high. Thus, generation of a noise is effectively limited. Also, the output shaft 12 can be driven by the relatively large torque. Therefore, the motor apparatus 150 is suitable as a drive source of the wiper system or of a sunroof system.

Fifth Embodiment

Figure 16:
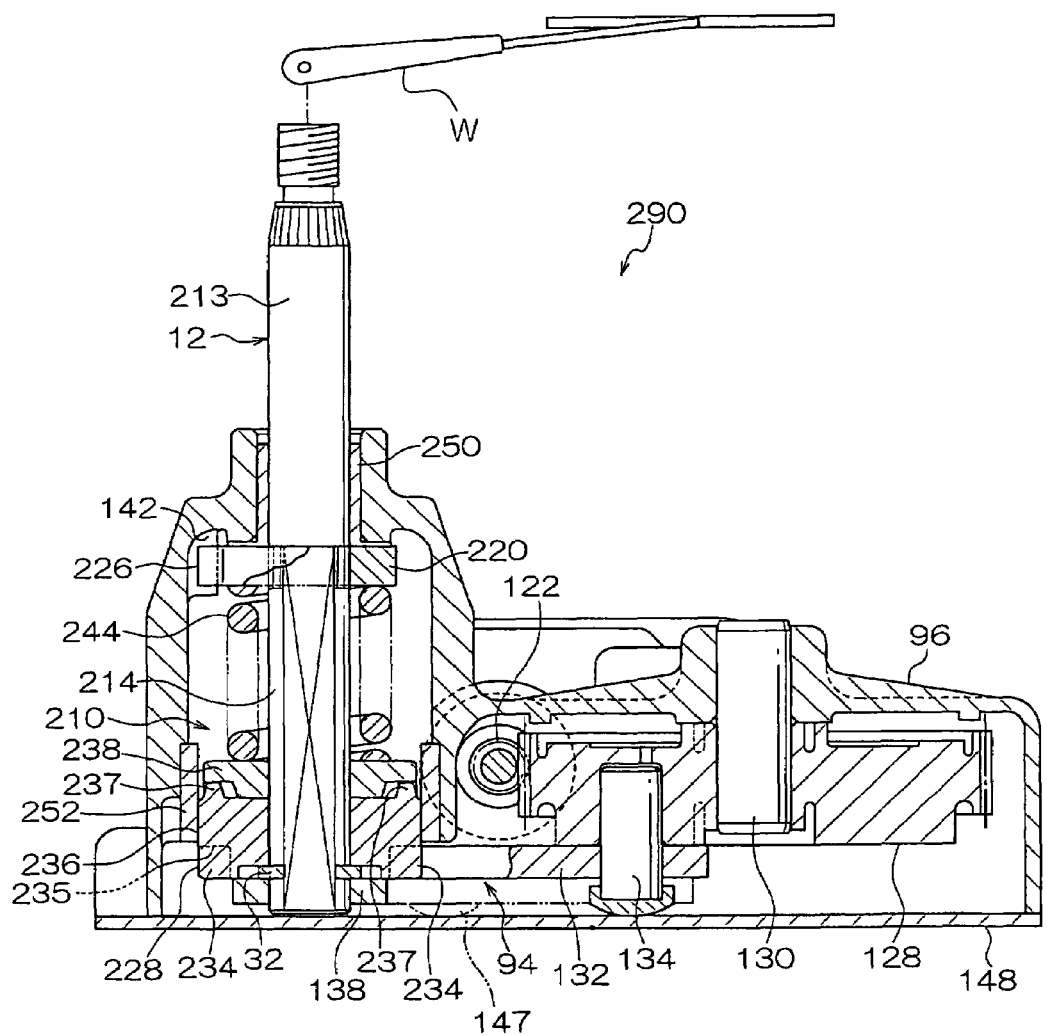
FIG. 16 is a cross sectional view showing an entire structure of a wiper motor apparatus having a clutch device according to a fifth embodiment of the present invention.

FIG. 16 is a cross sectional view showing a wiper motor apparatus 290, which has a clutch device (serving as an output shaft assembly of the present invention) 210 of a fifth embodiment of the present invention.

The wiper motor apparatus 290 has a structure, which is similar to that of the wiper motor apparatus 90 of the third embodiment and which includes the clutch device 210.

Figure 17:
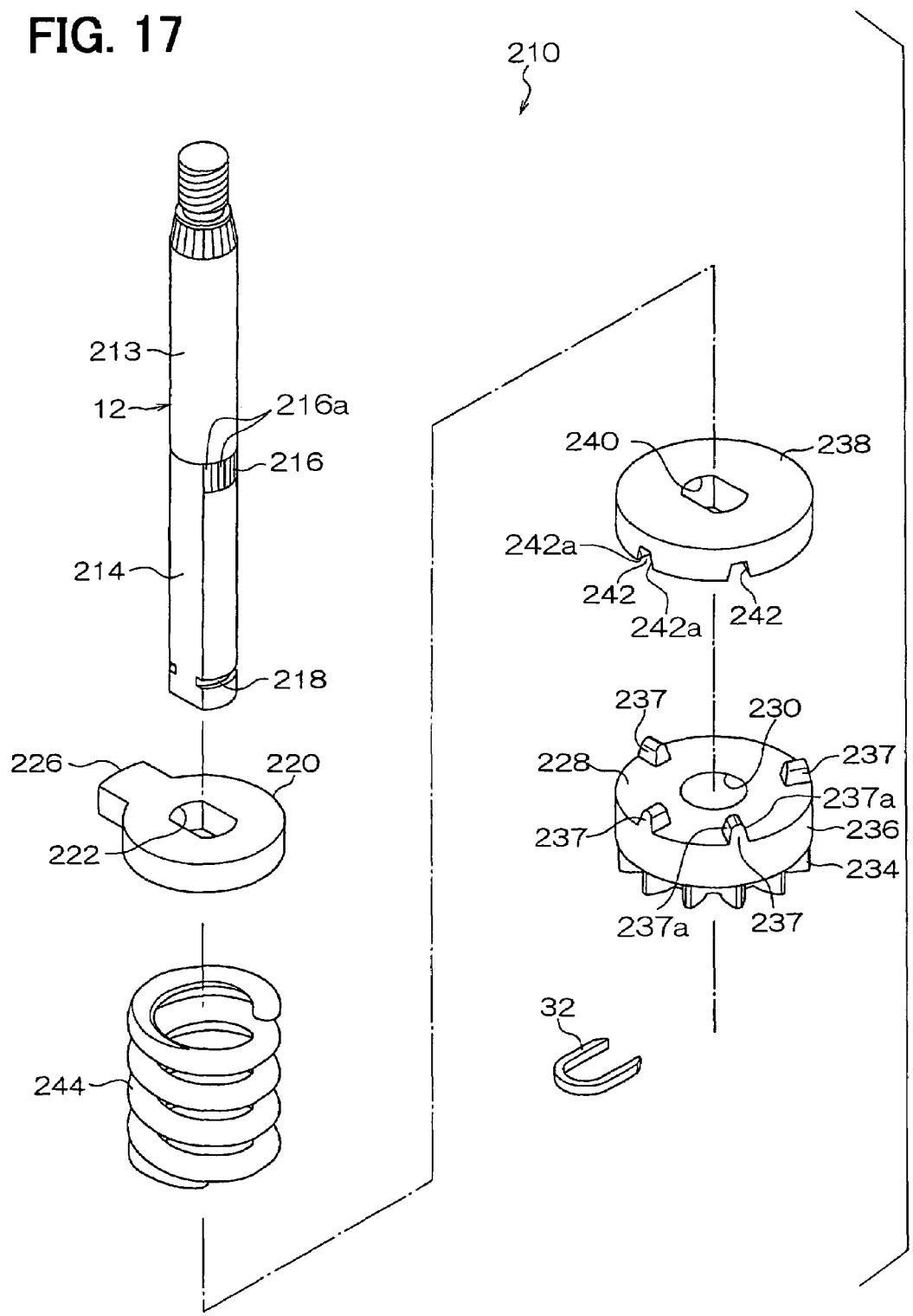
FIG. 17 is an exploded perspective view showing a structure of the clutch device of the fifth embodiment of the present invention.
Figure 18:
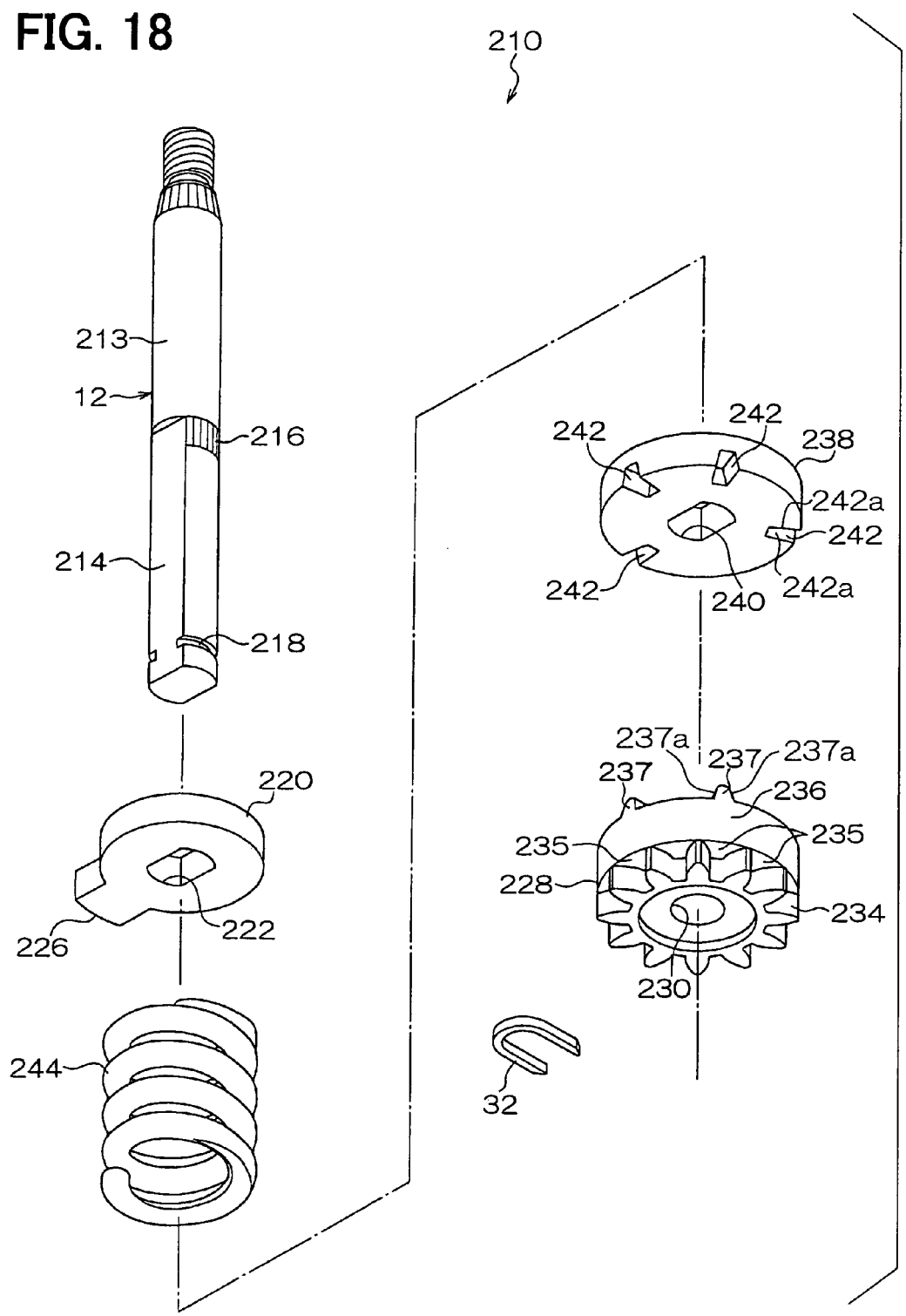
FIG. 18 is an exploded perspective view showing the structure of the clutch device of the fifth embodiment of the present invention.

As shown in FIGS. 17 and 18, the output shaft 12, to which the clutch device 210 is assembled, includes a cylindrical portion 213 having a circular cross section at the distal end side (the upper side in FIGS. 17 and 18) of the output shaft 12. A base end side (the lower side in FIGS. 17 and 18) of the output shaft 12 includes a relative rotation limiting portion 214. The relative rotation limiting portion 214 has a generally rectangular cross section (having a double D-cut cross sectional shape including two flat surfaces, which are displaced from one another by 180 degrees in the circumferential direction, and two arcuate surfaces, which connect between the flat surfaces).

As shown in FIG. 16, the cylindrical portion 213 of the output shaft 12 is rotatably supported by a bearing member 250, which is secured to the housing 96. Axial ridges 216a are formed in the arcuate surfaces in a distal end side (a cylindrical portion 213 side) of the relative rotation limiting portion 214 to form a rotation restraining portion 216. A removal limiting portion 218 is formed in a base end of the relative rotation limiting portion 214.

An engaging base (the base member) 220, which serves as a large diameter portion having a large diameter in the radial direction of the output shaft 12, is secured to the rotation restraining portion 216 of the relative rotation limiting portion 214 by, for example, press fitting in a coaxial manner with respect to the output shaft 12. That is, the engaging base 220 is supported by the output shaft 12 in such a manner that the engaging base 220 is axially immovable relative to the output shaft 12 and is non-rotatable relative to the output shaft 12. The engaging base 220 is formed into a circular disk shaped body and has a support hole 222 in its center. The support hole 222 has a generally rectangular cross section (the double D-cut cross sectional shape), which corresponds to the relative rotation limiting portion 214 of the output shaft 12. When the support hole 222 is securely connected to the rotation restraining portion 216, the engaging base 220 rotates together with the output shaft 12 while being axially immobilized relative to the output shaft 12. Furthermore, a stopper portion 226 is formed in an outer peripheral edge of the engaging base 220 and protrudes in the radial direction (the radial direction of the output shaft 12). The stopper portion 226 corresponds to the stopper projection 142 formed in the housing 96.

The structure is not limited to the one, in which the output shaft 12 and the engaging base 220 are formed separately and thereafter securely connected together. For instance, it is possible to provide another structure, in which the output shaft 12 and the engaging base 220 are formed integrally through, for example, a cold forging process (the structure, in which the flange like large diameter portion is formed integrally in the output shaft).

A gear member 228, which serves as an input disk (or the first rotatable member), is installed to the removal limiting portion 218 of the relative rotation limiting portion 214 in a coaxial manner with respect to the output shaft 12. The gear member 228 is formed into a cylindrical body and has a circular shaft hole 230 in the center of the gear member 228. The removal limiting portion 218 of the output shaft 12 is received through the shaft hole 230, and the clip 32 is installed to the end of the removal limiting portion 218. Thus, the gear member 228 is supported by the output shaft 12 at the one axial end side (the side opposite from the engaging base 220) in such a manner that the gear member 228 is non-detachable from the output shaft 12 in the axial direction of the output shaft 12 and is rotatable relative to the relative rotation limiting portion 214 of the output shaft 12. Therefore, in this case, the portion of the relative rotation limiting portion 214 of the output shaft 12, to which the gear member 228 is installed, serves as the relatively rotatable shaft portion of the output shaft 12, like the relatively rotatable shaft portion 18 of the first embodiment. In the fifth embodiment, the gear member 228 is a sintered metal product, which is formed by a powder metallurgy process in the following manner. That is, first, powder alloy is filled in a mold unit. Then, the powder alloy is molded in the mold unit by compression molding and is then sintered. The sintered metal product includes lubricant oil.

Gear teeth 234 are formed in an outer peripheral part of one axial end of the gear member 228, which is opposite from the engaging base 220. The gear teeth 234 are meshed with the toothed portion 136 of the sector gear 132 of the swing mechanism 94. When the drive force is supplied from the sector gear 132, the gear member 228 rotates about the output shaft 12.

Furthermore, as shown in FIG. 18, a connecting wall 235 is formed in the gear member 228 at the other axial end side of the gear teeth 234 (the engaging base 220 side that is opposite from the holding lever 138) to connect axial ends of the gear teeth 234 together. The connecting wall 235 and the holding lever 138 hold the toothed portion 136 of the sector gear 132 therebetween in the thickness direction of the toothed portion 136 of the sector gear 132. That is, the connecting wall 235 is opposed to the one end surface of the toothed portion 136 in the thickness direction, and the holding lever 138 is opposed to the other end surface of the toothed portion 136 in the thickness direction. Thus, movement of the sector gear 132 in the thickness direction is limited.

Furthermore, a cylindrical peripheral surface 236, which is coaxial with the output shaft 12, is formed in an outer peripheral part of the gear member 228, which is opposite from the gear teeth 234 with respect to the connecting wall 235. The cylindrical peripherals surface 236 is rotatably supported by a bearing member 252, which is secured to the housing 96. That is, on the other axial end side of the gear teeth 234, the gear member 228 has a circular disk shaped flange, which is coaxial with the output shaft 12, and the outer peripheral surface (the cylindrical peripheral surface 236) of this flange is supported by the bearing member 252.

Furthermore, four engaging projections (mating male portions or first side mating portions) 237 project toward the engaging base 220 in an outer peripheral edge of an end surface of the gear member 228, which is located on the other axial end side (the engaging base 220 side, i.e., the other axial end side of the output shaft 12). The engaging projections 237 are arranged in a coaxial manner with respect to the gear member 228 and are arranged at different intervals (each interval being different from its adjacent intervals) in the circumferential direction of the gear member 228. The engaging projections 237 correspond to engaging recesses (mating female portions or second side mating portions) 242 of an engaging plate 238, which will be described later.

The engaging plate 238, which serves as the clutch disk (or the second rotatable member), is supported by the relative rotation limiting portion 214 of the output shaft 12 between the engaging base 220 and the gear member 228 in such a manner that the engaging plate 238 is coaxial with the output shaft 12. The engaging plate 238 is formed as a circular disk and has a shaft hole 240 at its center. The shaft hole 240 has a generally rectangular cross section (the double D-cut cross sectional shape), which corresponds to the relative rotation limiting portion 214. When the shaft hole 240 receives the output shaft 12 (the relative rotation limiting portion 214), the engaging plate 238 is positioned on the other axial end side of the output shaft 12 (the engaging base 220 side) with respect to the gear member 228. The engaging plate 238 is supported by the output shaft 12 in such a manner that the engaging plate 238 is non-rotatable relative to the output shaft 12 and is axially movable relative to the output shaft 12. Thus, the engaging plate 238 rotates integrally with the output shaft 12 and is relatively movable with respect to the gear member 228 in the axial direction of the output shaft 12. In the fifth embodiment, the engaging plate 238 is a sintered metal product, which is formed through the powder metallurgy process described above and contains lubricant oil.

The four engaging recesses 242 are recessed in an outer peripheral part of a rear surface (a gear member 228 side, i.e., the one axial end side of the output shaft 12) of the engaging plate 238. The engaging recesses 242 correspond to the four engaging projections 237 of the gear member 228. Furthermore, the engaging recesses 242 are arranged in a coaxial manner with respect to the engaging plate 238 and are arranged at different intervals (each interval being different from its adjacent intervals) in the circumferential direction of the engaging plate 238.

The four engaging recesses 242 are engageable with the four engaging projections 237, respectively, of the gear member 228, i.e., the engaging plate 238 is engageable with the gear member 228. Therefore, in the normal operational state (the rotating state), when the gear member 228 is rotated, the rotational force of the gear member 228 is transmitted to the engaging plate 238. Thus, the engaging plate 238 is rotated together with the gear member 228.

However, as discussed above, the engaging projections 237 and the engaging recesses 242 are arranged at different intervals (each interval being different from its adjacent intervals) in the circumferential direction of the gear member 228 and of the engaging plate 238. Thus, the engaging plate 238 (the output shaft 12 and the wiper) and the gear member 228 are engaged with one another only at a predetermined single circumferential point. That is, in a circumferential point other than the predetermined single circumferential point, even when one of the engaging projections 237 coincides with, i.e., is aligned with one of the engaging recesses 242, the other three engaging projections 237 do not align with the other three engaging recesses 242. Thus, when the engaging projections 237 are displaced from the engaging recesses 242, the engaging plate 238 contacts the gear member 228 through at least three engaging projections 237 (providing three point support).

Furthermore, lateral walls 237a of the engaging portions 237 of the gear member 228 and lateral walls 242a of the engaging recesses 242 of the engaging plate 238 have slant surfaces. In other words, each of the engaging projections 237 of the gear member 228 has a trapezoidal cross section, and each of the engaging recesses 242 of the engaging plate 238 has a corresponding trapezoidal cross section. In this way, when the gear member 228 is rotated, a rotational force is transmitted from the gear member 228 to the engaging plate 238, and thus a force component is generated in the engaging plate 238 in the axial direction of the output shaft 12 toward the engaging base 220.

It should be understood that all of the lateral walls 237a of the engaging projections 237 of the gear member 228 and the lateral walls 242a of the engaging recesses 242 of the engaging plate 238 do not need to have the slant surfaces described above. For example, only one of the lateral walls 237a of each of the engaging projections 237 of the gear member 228 can be made as the slant surface, which is slanted in the circumferential direction or is slanted relative to the circumferential direction. Also, only one of the lateral walls 242a of each of the engaging recesses 242 of the engaging plate 238 can be made as the slant surface, which is slanted in the circumferential direction or is slanted relative to the circumferential direction. Even with this structure, the force component can be generated in the engaging plate 238 in the axial direction of the output shaft 12 upon transmission of the rotational force from the gear member 228 to the engaging plate 238.

Furthermore, a compression coil spring 244 is arranged between the engaging plate 238 and the engaging base 220. The coil spring 244 is spirally wound around the output shaft 12 and is compressible in the axial direction of the output shaft 12. The coil spring 244 applies a predetermined resistive force (a predetermined restoring force generated upon resilient deformation of the coil spring 244 through the axial movement of the engaging plate 238) against axial movement of the engaging plate 238 toward the other output shaft 12 axial end side (the engaging base 220 side) from the engaged state, in which the engaging projections 237 of the gear member 228 and the engaging recesses 242 of the engaging plate 238 are engaged with one another.

In other words, normally, the engaging projections 237 of the gear member 228 are engaged with, i.e., are received in the engaging recesses 242 of the engaging plate 238, and the coil spring 244 maintains this engaged state. When the engaging projections 237 of the gear member 228 try to move away from the engaging recesses 242 of the engaging plate 238, the engaging plate 238 tries to axially move toward the engaging base 220. The coil spring 244 provides the resistive force (the restring force) against this axial movement of the engaging plate 238.

Furthermore, as described above, when the engaging projections 237 of the gear member 228 are received in, i.e., are engaged with the engaging recesses 242 of the engaging plate 238, the rotational force is transmitted from the gear member 228 to the engaging plate 238. However, even when the engaging projections 237 of the gear member 228 are disengaged from the engaging recesses 242 of the engaging plate 238, i.e., even when the engaging plate 238 is moved toward the engaging base 220, a predetermined frictional force is generated between the engaging projections 237 of the gear member 228 and the rear surface of the engaging plate 238 due to the urging force (the restoring force) generated by the coil spring 244. Therefore, the engaging plate 238 is rotated together with the gear member 228 due to the frictional force of the coils spring 244. The urging force of the coil spring 244 is set to achieve this rotation of the engaging plate 238 together with the gear member 228 even in the disengaged state.

In the normal state, i.e., the state where the engaging plate 238 does not try to move toward the engaging base 220, the coil spring 244 may always exert an appropriate urging force between the engaging base 220 and the engaging plate 238. Alternatively, the coil spring 244 may exert the above urging force (the restoring force) only when the engaging plate 238 tries to move toward the engaging base 220, i.e., only when the engaging projections 237 try to disengage from the engaging recesses 242.

As shown in FIG. 16, the above-described stopper projection 142 is formed in the housing 96 to correspond with the stopper portion 226 of the engaging base 220.

The stopper projection 142 is formed as the arcuate body and is located in a rotational moving path of the stopper portion 226, along which the stopper portion 226 moves during the rotation of the engaging base 220. One circumferential end of the stopper projection 142 forms the rotation limiter 144, and the other circumferential end of the stopper projection 142 forms the rotation limiter 146. That is, each of the rotation limiters 144, 146 of the stopper projection 142 can engage the stopper portion 226. When the stopper portion 226 engages the rotation limiter 144 or the rotation limiter 146 of the stopper projection 142, further rotation of the engaging base 220 (the output shaft 12) is limited. Thus, at the time of rotating the engaging base 220 (the output shaft 12) together with the engaging plate 238 through application of the rotational drive force of the gear member 228 to the engaging base 220 (the output shaft 12), when the stopper portion 226 engages the rotation limiter 144 or the rotation limiter 146 of the stopper projection 142, further rotation of the engaging base 220 (the output shaft 12) is forcefully limited. Thus, relative rotation between the gear member 228 and the engaging base 220 (the output shaft 12) occurs.

The wiper (not shown) may be directly connected to the output shaft 12, which is reciprocally rotated by the gear member 228. Alternatively, the wiper (not shown) may be indirectly connected to the output shaft 12 through a link or a rod. Thus, the wiper is reciprocally swung by the reciprocal rotation of the output shaft 12.

Next, operation of the fifth embodiment will be described.

In the wiper motor apparatus 290, when the motor main body 92 (the armature 108) is rotated, the rotational force is transmitted to the worm wheel 128 through the worm gear 122 to rotate the worm wheel 128. When the worm wheel 128 is rotated, the sector gear 132, which is connected to the worm wheel 128, is reciprocally swung. Then, the reciprocal swing motion of the sector gear 132 causes reciprocal rotation of the gear member 228.

In the normal operational state, the engaging projections 237 of the gear member 228 are engaged with the engaging recesses 242 of the engaging plate 238. Furthermore, even when the engaging plate 238 tries to move in the axial direction of the output shaft 12 from the engaged state, in which the engaging projections 237 are engaged with the engaging recesses 242, the predetermined resistive force is applied from the coil spring 244 to the engaging plate 238. Thus, the engaged state is maintained. Furthermore, the engaging plate 238 is not rotatable about the axis of the output shaft 12 relative to the output shaft 12. Thus, when the gear member 228 is reciprocally rotated, the rotational drive force is transmitted from the gear member 228 to the engaging plate 238 through the engaging projections 237 and the engaging recesses 242. Thus, the output shaft 12 is rotated integrally with the engaging plate 238.

In this way, the wiper W, which is connected to the output shaft 12, is reciprocally swung upon reciprocal rotation of the output shaft 12.

For example, when an excessively large external force (load) is applied to the output shaft 12 through the wiper, the output shaft 12 is reversely rotated or is arrested. Then, the engaging plate 238, which is rotated together with the output shaft 12, receives the rotational force in the direction that causes the rotation of the engaging plate 238 relative to the gear member 228. Since the lateral walls 237a of the engaging projections 237 of the gear member 228 and the lateral walls 242a of the engaging recesses 242 of the engaging plate 238 have the slant surfaces (i.e., having the trapezoidal cross section), the force component is generated in the engaging plate 238 in the axial direction of the output shaft 12 toward the engaging base 220 due to the relative rotational force generated by the relative rotation between the gear member 228 and the engaging plate 238. That is, a portion of the relative rotational force generated by the relative rotation between the gear member 228 and the engaging plate 238 serves as the force component, which moves the engaging plate 238 in the axial direction of the output shaft 12 to release the engagement between the engaging projections 237 of the gear member 228 and the engaging recesses 242 of the engaging plate 238. When this relative rotational force (the force component) becomes equal to or greater than a predetermined value, the engaging plate 238 overcomes the resistive force of the coil spring 244 and is thus forcefully moved in the axial direction of the output shaft 12 to release the above engagement between the engaging projections 237 of the gear member 228 and the engaging recesses 242 of the engaging plate 238. In this way, the engaging plate 238, i.e., the output shaft 12 is rotated relative to the gear member 228.

Thus, in the state where the wiper is frozen to the wiping glass surface in the normal stop position in the rotational angular range or in the state where heavy snow is accumulated on the wiper held in the normal stop position to arrest the wiper, when the motor main body 92 of the wiper motor apparatus 290 is rotated to apply excessively large load or sudden load, the clutch device 210 is declutched. Also, during the operation of the wiper within the rotational angular range (the normal wiping range) of the wiper, when an excessively large force is applied to the output shaft 12 through the wiper, for example, when heavy snow accumulated on the roof of the vehicle falls along the glass surface onto the wiper, which is placed at a position other than the lower turning point at the time of wiping movement of the wiper, the clutch device 210 is declutched. Thus, it is possible to limit application of excessively large force to the drive force transmitting components (the components, such as the sector gear 132, the worm wheel 128, the worm gear 122 and the motor main body 92, which are located between the output shaft 12 and the armature 108) other than the gear member 228. In this way, each component, which is located after the gear member 228, can be protected. Thus, it is possible to limit damage to each above component and the burnout of the motor main body 92.

Furthermore, it is only required to set the strength of each component located after the gear member 228 based on the rotation transmitting force (the declutching force) between the gear member 228 and the engaging plate 238. Thus, it is not required to set the excessive strength of each component upon consideration of the excessively large external force (load). As a result, manufacturing costs can be reduced.

Furthermore, the driven component (e.g., the wiper), which is connected to the output shaft 12, can be also protected since the declutching of the clutch device 210 causes absorption of shocks applied to the driven component (e.g., the wiper).

In the wiper motor apparatus 290, the shaft 140, which serves as a swing center axis of the sector gear 132, and the output shaft 12 are connected to each other through the holding lever 138 arranged on one side of the sector gear 132 in the thickness direction of the sector gear 132. Thus, a shaft-to-shaft distance (a shaft-to-shaft pitch) between the shaft 140, which serves as the swing center axis of the sector gear 132, and the output shaft 12 is kept constant. Furthermore, the toothed portion 136 of the sector gear 132 is held between the holding lever 138 located on one side and the connecting wall 235 of the gear member 228 located on the other side (the engaging plate 238 side) in the thickness direction of the sector gear 132. Thus, the engagement between the gear teeth 136 and the toothed portion 234 in the thickness direction of the sector gear 132 is limited, i.e., wobbling of the sector gear 132 in the thickness direction of the sector gear 132 is limited without requiring two holding members (the holding levers) on both sides of the sector gear 132 in the thickness direction of the sector gear 132. In this way, appropriate engagement between the sector gear 132 and the gear member 228 is maintained.

Furthermore, in the wiper motor apparatus 290, the holding lever 138 is arranged on the opposite side of the sector gear 132, which is opposite from the worm wheel 128 in the thickness direction of the sector gear 132. Thus, the holding lever 138 does not interfere with the worm wheel 128. Therefore, a degree of freedom in terms of designing the connecting position between the sector gear 132 and the worm wheel 128 is improved, i.e., a degree of freedom in terms of designing the installation position of the support shaft 134 relative to the worm wheel 128 is improved.

Furthermore, in the wiper motor apparatus 290, unlike the previously proposed wiper motor apparatus, the holding members (the holding levers) are not provided on the opposite sides, respectively, of the sector gear 132 in the thickness direction of the sector gear 132. That is, in the wiper motor apparatus 290, the single holding lever 138 is arranged only on the one side of the sector gear 132 in the thickness direction of the sector gear 132. Thus, a space for accommodating the holding member can be reduced. Therefore, the size and weight of the entire device structure can be reduced.

As described above, in the wiper motor apparatus 290 of the fifth embodiment, the appropriate engagement between the sector gear 132 and the gear member 228 is maintained, and the size of the device can be reduced.

Furthermore, in the case of the previously proposed wiper motor apparatus, which has the holding members arranged on the opposite sides, respectively, of the sector gear in the thickness direction of the sector gear (the opposite sides of the gear member), one of the holding members prevents engagement of the engaging plate of the clutch device to the gear member. However, in the wiper motor apparatus 290, the holding lever 138 is provided only on the opposite side of the sector gear 132, which is opposite from the engaging plate 238 in the thickness direction of the sector gear 132 (the thickness direction of the gear member 228). Thus, the holding lever 138 does not prevent the engagement of the gear member 228 with the engaging plate 238. Therefore, the positional limitations of the clutch device 210 are alleviated.

Furthermore, in the wiper motor apparatus 290, the engaging base 220 (the large diameter portion) is securely connected to the rotation restraining portion 216 of the output shaft 12, in which the ridges are formed. The engaging base 220 is securely connected to the rotation restraining portion 216 of the output shaft 12 particularly in the rotational direction about the axis. Removal of the gear member 228 from the output shaft 12 is limited by the removal limiting portion 218 of the output shaft 12. The engaging plate 238 is axially moveably supported by the relative rotation limiting portion 214 of the output shaft 12 between the engaging base 220 and the gear member 228. Thus, each corresponding component is installed to the output shaft 12, and the engaging plate 238 and the coil spring 244 are arranged in the predetermined space (the predetermined dimension) between the engaging base 220 and the gear member 228. As a result, as discussed above, the force (the declutching force), which is required to axially move the engaging plate 238, can be easily set.

Furthermore, in the wiper motor apparatus 290, since the coil spring 244 is formed as the resilient member, the stable spring characteristic is achieved. That is, in the case where the rubber member is formed as the resilient member, the grease or the like applied to the clutch device 210 could be adhered to the rubber member to deteriorate the rubber member. However, in the case of the coil spring 244, the coil spring 224 is not deteriorated by the grease or the like adhered to the coil spring 224, so that the spring characteristic of the coil spring 224 is stabilized.

Also, the coil spring 244 is spirally wound around the output shaft 12 and is arranged between the engaging plate 238 and the engaging base 220, which has the large diameter in the radial direction of the output shaft 12 and is axially immovable. Thus, the engaging plate 238 can be urged against the gear member 228 in the stable manner, and the stable resistive force can be applied. That is, the engaging plate 238 can uniformly disperse the resilient force of the coil spring 244 in the engaged portion or the connection between the gear member 228 and the engaging plate 238. Thus, the engagement between the gear member 228 and the engaging plate 238 is stabilized, and the rotation transmitting force (the declutching force) between the gear member 228 and the engaging plate 238 is stabilized. Therefore, the stable clutch performance can be achieved, and the declutching force can be appropriately set. As a result, each component of the wiper motor apparatus 290 can be more reliably protected.

Furthermore, in the wiper motor apparatus 290, the gear member 228, which is supported by the output shaft 12, has the outer peripheral part, which is opposite from the gear teeth 234 with respect to the connecting wall 235 and is formed as the cylindrical peripheral surface 236. The cylindrical peripheral surface 236 is rotatably supported by the bearing member 252, which is secured to the housing 96. That is, in the wiper motor apparatus 290, the gear member 228, which receives the load from the sector gear 132, is directly supported by the bearing member 252 of the housing 96. Thus, the supporting structural rigidity of the gear member 228 is improved. In this way too, the engagement between the gear member 228 and the sector gear 132 is stabilized. Furthermore, the base end portion of the output shaft 12 is supported by the housing 96 (the bearing member 252) through the gear member 228. Thus, a dedicated space for supporting the base end portion of the output shaft 12 relative to the housing 96 is not required. In other words, the accommodating space for accommodating the gear member 228 and the support space for supporting the base end portion of the output shaft 12 are common. Furthermore, there is provided a relatively long axial distance measured in the axial direction of the output shaft 12 between the bearing member 252, which supports the base end portion of the output shaft 12, and the bearing member 250, which supports the distal end portion of the output shaft 12. In this way, the supporting structural rigidity of the output shaft 12 relative to the housing 96 is improved.

Furthermore, in the wiper motor apparatus 290, each of the gear member 228 and the engaging plate 238 is made as the sintered metal product, which is made through molding of the powder alloy. Thus, the gear member 228 and the engaging plate 238 can be formed through the powder metallurgy process with the high accuracy and with the good yield of the material. Also, the gear member 228 and the engaging plate 238, which are made as the sintered metal products, contain the lubricant oil in the sintered metal. Thus, self-lubrication is achieved in the engaged portions (e.g., the engaging projections 237 and the engaging recesses 242) between the gear member 228 and the engaging plate 238. Furthermore, self-lubrication is also achieved in the gear teeth 234 of the gear member 228, which are engaged with the toothed portion 136 of the sector gear 132, to limit wearing and generation of noises.

Furthermore, in the wiper motor apparatus 290, the engaging projections 237 of the gear member 228 are arranged at different intervals (each interval being different from its adjacent intervals) in the circumferential direction of the gear member 228, and the engaging recesses 242 of the engaging plate 238 are arranged at different intervals (each interval being different from its adjacent intervals) in the circumferential direction of the engaging plate 238. In the declutched state where each engaging projection 237 is removed from the corresponding engaging recess 242, the engaging plate 238 engages the gear member 228 through at least three engaging projections 237 (achieving the three point support). Thus, the engaged state between the engaging plate 238 and the gear member 228 is stabilized in the declutched state.

Also, the gear member 228 and the engaging plate 238 (the output shaft 12 and the wiper) are engaged with one another only in the predetermined single circumferential point. Thus, in the declutched state where the gear member 228 and the engaging plate 238 are placed in a position, which is other than the predetermined single point, and thus each engaging projection 237 is removed from the corresponding engaging recess 242, when the wiper is manually rotated by, for example, a vehicle occupant, the gear member 228 and the engaging plate 238 are engaged with one another always at the predetermined single point. Thus, the engaging plate 238 (the output shaft 12 and the wiper) can be easily and rapidly returned to the originally set state (initially set state) relative to the gear member 228. Also, the wiper system can be operated once again without damaging the wiper system. Particularly, in the case where the above predetermined single point is set to be the predetermined single point in the reciprocal rotational angular range (the reciprocal rotational wiping angular range), which is set to be smaller than the limited angular range that is limited by the rotation limiters 144, 146 of the stopper projection 142, when the wiper system resumes its operation upon removal of the excessively large external force, the gear member 228 and the engaging plate 238 reengage with one another within a single reciprocal wiping movement of the wiper to achieve the self-recovery.

Furthermore, in the clutch device 210 of the wiper motor apparatus 290, the gear member 228 is reciprocally rotated at the reduced speed by the swing mechanism 94 (the worm gear 122, the worm wheel 128 and the sector gear 132). Thus, the output shaft 12 can be driven by the relatively large torque. Therefore, the wiper, which is connected to the output shaft 12, can be appropriately reciprocally driven.

Therefore, the wiper motor apparatus 290 is also suitable as the wiper motor apparatus of the vehicle, such as the truck or the constructor having the cab-over type cockpit, which will likely have an excessively large force (load) on the output shaft 12 through the wiper at the time of, for example, application of heavy snow, which is accumulated on the roof of the vehicle, to the wiper arm and thus to the wiper motor apparatus 290 upon vertical falling of the heavy snow along the glass surface.

Furthermore, in the clutch device 210 of the wiper motor apparatus 290, the engaging projections 237 of the gear member 228 are received in the engaging recesses 242 of the engaging plate 238 to transmit the rotational force from the gear member 228 to the engaging plate 238. Thus, the transmission of the drive force between the gear member 228 and the engaging plate 238 is reliably carried out. In addition, the lateral walls 237a of the engaging projections 237 of the gear member 228 and the lateral walls 242a of the engaging recesses 242 of the engaging plate 238 have the slant surfaces, so that the declutching force can be easily set based on the angle of the slant surface and the resistive force (resiliently deforming force) of the coil spring 244.

Furthermore, in the wiper motor apparatus 290, in the normal operational state (the rotating state), as discussed above, at the time of transmitting the rotational drive force from the gear member 228 to the output shaft 12, the rotational drive force can be transmitted without causing sliding movement at any relevant part. More specifically, the resistive force of the coil spring 244, which is applied against the axial movement of the engaging plate 238 from the engaged state of the engaging plate 238 to maintain the engaged state between the engaging projections 237 of the gear member 228 and the engaging recesses 242 of the engaging plate 238, is not wasted as the sliding frictional force. Thus, it is possible to limit a reduction in the transmission efficiency of the rotation. Furthermore, the rotational drive force can be transmitted without causing sliding movement of the corresponding component, so that generation of a noise, which would be generated by the sliding movement of the corresponding component, can be advantageously limited.

Furthermore, as discussed above, the resistive force of the coil spring 244, which is applied against the axial movement of the engaging plate 238 from the engaged state to maintain the engagement between the engaging projections 237 and the engaging recesses 242, is received by the engaging base 220, which is secured to the output shaft 12, and is also received by the gear member 228, which is supported by the output shaft 12 in a manner that limits axial removal of the gear member 228 from the output shaft 12. That is, the force for maintaining the engaged state is supported by the two constituent components, i.e., the engaging base 220 and the gear member 228, which are installed to the output shaft 12. In other words, the clutch device 210 is formed as a complete sub-assembly of the output shaft 12, which does not require any additional component, such as a housing 96, to serve as the sub-assembly. Thus, the clutch device 210 can be handled as the single component, which is formed as the sub-assembly of the output shaft 12.

As described above, in the wiper motor apparatus 290 (the clutch device 210) of the fifth embodiment, it is possible to maintain the appropriate engagement between the sector gear 132 and the gear member 228, and the size of the device can be reduced.

In the fifth embodiment, the gear member 228 and the engaging plate 238 are made as the sintered metal products, which contain the lubricant oil. However, the present invention is not limited to this. For example, only one of the gear member 228 and the engaging plate 238 can be made as the sintered metal product, which contains the lubricant oil.

Furthermore, in the fifth embodiment, the wiper motor apparatus 290 includes both the swing mechanism 94 and the clutch device 210. However, the present invention is not limited to this. For example, the clutch device can be eliminated from the wiper motor apparatus. In such a case, the gear member should be provided integrally in the output shaft in an axially non-movable manner relative to the output shaft.

Sixth Embodiment

Figure 19:
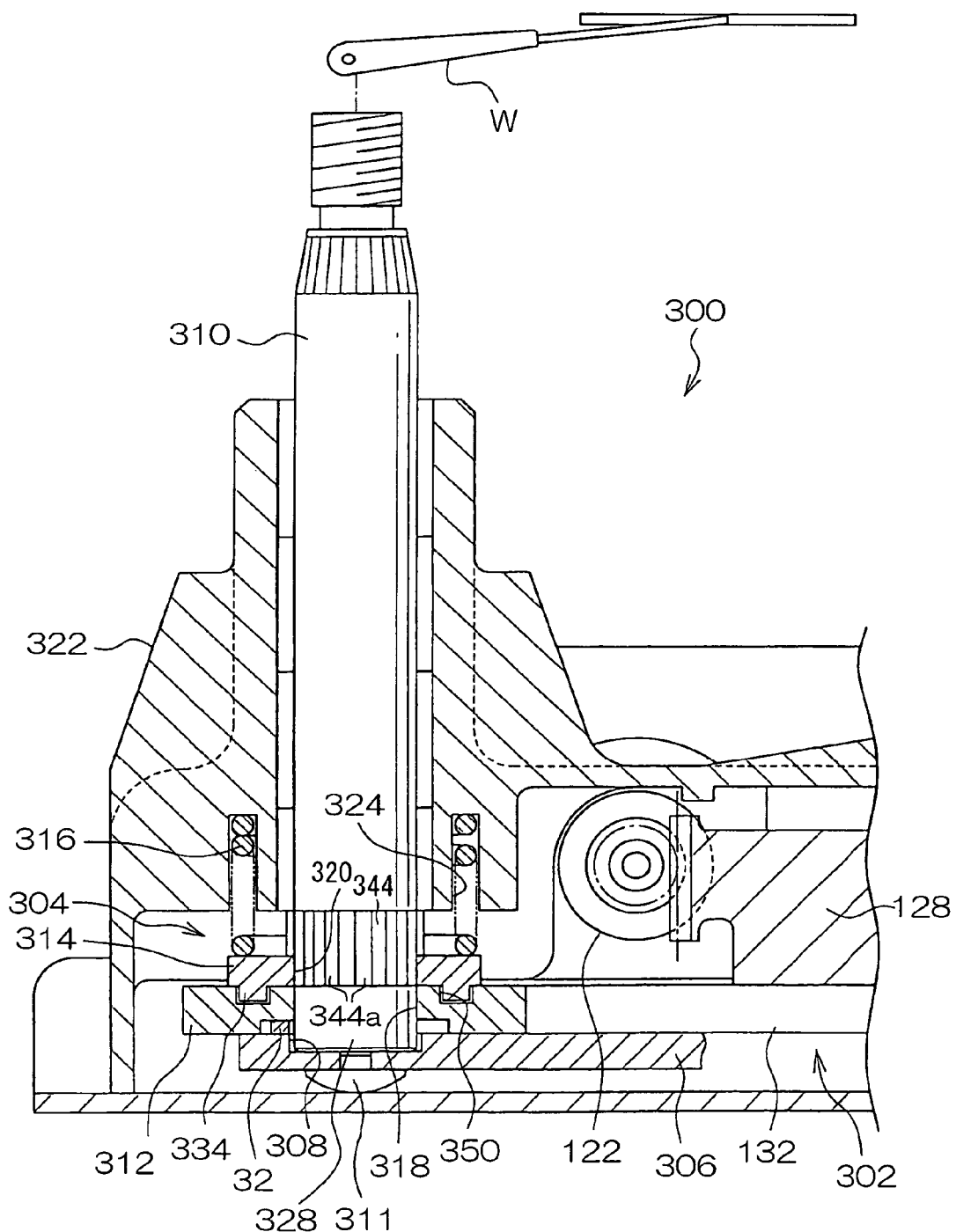
FIG. 19 is a cross sectional view showing a wiper motor apparatus according to a sixth embodiment of the present invention.

FIG. 19 is cross sectional view showing a wiper motor apparatus 300, which includes a clutch device (serving as an output shaft assembly of the present invention) 304 according to a sixth embodiment of the present invention.

The wiper motor apparatus 300 has a structure, which is basically the same as that of the wiper motor apparatus 90 of the third embodiment. The wiper motor apparatus 300 includes the motor main body 92, a swing mechanism 302 and a clutch device 304.

The motor main body 92 has the same structure as the motor main body 92 of the third embodiment.

The swing mechanism 302 has a structure, which is basically the same as that of the swing mechanism 94 except a holding lever 306. Similar to the holding lever 138, one end of the holding lever 306 is connected to the sector gear 132 through the support shaft 140. The other end of the holding lever 306 has a circular recess 308, which rotatably receives the base end portion of the output shaft 310. A resin sliding member 311 is connected to a surface of the holding lever 306, which is opposite from the recess 308, in a coaxial manner with respect to the output shaft 310 to receive a thrust force exerted in the output shaft 310.

Furthermore, the clutch device 304 includes a gear member (the input disk or the first rotatable member) 312, an engaging plate (the clutch disk or the second rotatable member) 314 and a torsion coil spring 316. The clutch base 20 of the third embodiment is eliminated.

The gear member 312 is coaxial with the output shaft 310 and is supported by the output shaft 310 on the other axial end side (the upper end side in FIG. 19) of the output shaft 310 with respect to the holding lever 306 of the swing mechanism 302. The gear member 312 is formed as a gear body and has a shaft hole 318 in its center. The base end portion of the output shaft 310 is received through the shaft hole 318 of the gear member 312. Thus, the gear member 312 is supported by the output shaft 310 in such a manner that the gear member 312 is rotatable about a relatively rotatable shaft portion 328 of the output shaft 310. Although not shown in FIG. 19, the removal limiting portion 16 of the first embodiment is formed in the base end portion of the output shaft 310. The removal limiting clip 32 is installed to the removal limiting portion 16 to limit removal of the gear member 312 from the output shaft 310 on the one axial end side (the holding lever 306 side).

A pair of engaging recesses (first side mating portions) 350 is recessed in a front surface (an end surface opposite from the holding lever 306) of the gear member 312. The engaging recesses 350 are similar to the engaging recesses, i.e., the mating female portions 50 of the first embodiment or are similar to the engaging recesses 242 of the fifth embodiment. The engaging recesses 350 correspond to the engaging plate 314.

The engaging plate 314 is located on the front surface side of the gear member 312 in such a manner that the engaging plate 314 is coaxial with the output shaft 310. The engaging plate 314 is connected to the output shaft 310 via a spline connection. More specifically, a plurality of axial ridges is formed in an outer peripheral surface of a rotation restraining portion 344 of the output shaft 310, which corresponds to the engaging plate 314. The engaging plate 314 has a shaft hole 320 at its center. A plurality of recesses is formed in an inner peripheral surface of the shaft hole 320 to engage with the axial ridges of the output shaft 310. Thus, the engaging plate 314 is supported by the output shaft 310 in such a manner that the engaging plate 314 is non-rotatable about the axis of the output shaft 310 and is axially movable relative to the output shaft 310. Furthermore, the engaging plate 314 is engageable with the gear member 312 and is also axially movable on a side opposite from the gear member 312.

A pair of engaging projections (second side mating portions) 334 protrudes from a rear surface of the engaging plate 314, which is on a gear member 312 side of the engaging plate 314. The engaging projections 334 are similar to the engaging projections, i.e., the mating male portions 34 of the first embodiment or are similar to the engaging projections 237 of the fifth embodiment. With the above structure, when the gear member 312 is rotated, the rotational force of the gear member 312 is transmitted to the engaging plate 314. Thus, the engaging plate 314 is rotated together with the gear member 312.

The torsion coil spring 316, which serves as the resilient member, is provided on the front surface side (the side opposite from the gear member 312) of the engaging plate 314 in such a manner that the torsion coil spring 316 is coaxial with the output shaft 310. The torsion coil spring 316 is received in an annular groove 324, which is recessed in a housing 322, which is similar to the housing 96 of the third embodiment. One axial end of the torsion coil spring 316 is engaged with a base wall of the annular groove 324, and the other axial end of the torsion coil spring 316 is engaged with the engaging plate 314.

The torsion coil spring 316 applies a predetermined resistive force (a restoring force generated upon resilient deformation of the torsion coil spring 316 due to the axial movement of the engaging plate 314) against the axial movement of the engaging plate 314 toward the other output shaft 310 axial end side (the side of the engaging plate 314 opposite from the gear member 312) from the engaged state, at which the engaging projections 334 of the engaging plate 314 and the engaging recesses 350 of the gear member 312 are engaged with one another to rotate together.

In the normal operational state (i.e., in the state where the engaging plate 314 does not try to move axially on the side opposite from the gear member 312), the torsion coil spring 316 may always exert an appropriate urging force between the housing 322 and the engaging plate 314. Alternatively, the torsion coil spring 316 may exert the above urging force (the restoring force) only when the engaging plate 314 moves on the side opposite from the gear member 312, i.e., only when the engaging projections 334 try to disengage from the engaging recesses 350.

Similar to the third embodiment, the wiper W is directly or indirectly connected to the output shaft 310. In the case where the wiper W is indirectly connected to the output shaft 310, the wiper W may be connected to the output shaft 310 through, for example, the link or the rod. The wiper W is reciprocally rotated through reciprocal rotation of the output shaft 310.

Other components are the same as those of the wiper motor 90 of the third embodiment.

Next, operation of the sixth embodiment will be described.

In the above wiper motor apparatus 300, advantages similar to those of the wiper motor apparatus 90 of the third embodiment will be achieved.

That is, in the wiper motor apparatus 300, when the motor main body 92 (the armature 108) is rotated, the rotational force is transmitted to the worm wheel 128 through the worm gear 122 to rotate the worm wheel 128. When the worm wheel 128 is rotated, the sector gear 132, which is connected to the worm wheel 128, is swung. The swing motion of the sector gear 132 causes reciprocal rotation of the gear member 312.

In the normal operational state, the engaging projections 334 of the engaging plate 314 are engaged with, i.e., are fitted to the engaging recesses 350, respectively, of the gear member 312. Thus, the engaging plate 314 is coupled with the gear member 312 at the maximum rotational coupling force to rotate integrally with the gear member 312 without making relative rotation between the gear member 312 and the engaging plate 314. In this state, even when the engaging plate 314 tries to axially move to release the engagement between the engaging projections 334 and the engaging recesses 350, the predetermined resistive force is applied from the torsion coil spring 316 to the engaging plate 314. Thus, the engagement between the engaging projections 334 and the engaging recesses 350 is maintained. Therefore, when the drive force is supplied to the gear member 312 to rotate the gear member 312 about the axis of the output shaft 310, the rotational drive force is transmitted from the gear member 312 to the engaging plate 314 through the engaging recesses 350 and the engaging projections 334. Since the engaging plate 314 is connected to the output shaft 310 in such a manner that the engaging plate 314 is non-rotatable relative to the output shaft 310, the output shaft 310 is rotated integrally with the engaging plate 314.

In this way, the wiper W, which is connected to the output shaft 310, is reciprocally swung through the reciprocal rotation of the output shaft 310.

For example, when an excessively large external force (load), which is equal to or greater than a predetermined value, is applied to the output shaft 310 through the wiper W, the output shaft 310 is reversely rotated or is arrested. Then, the engaging plate 314, which is rotated together with the output shaft 310, receives a rotational force in a direction that causes rotation of the engaging plate 314 relative to the gear member 312. Since lateral walls of the engaging recesses 350 (not shown but similar to the lateral walls 242a of the engaging recesses 242 of the fifth embodiment) of the gear member 312 and lateral walls of the engaging projections 334 (not shown but similar to the lateral walls 237a of the engaging projections 237 of the fifth embodiment) of the engaging plate 314 have slant surfaces (i.e., having the trapezoidal cross section), the force component is generated in the engaging plate 314 in the axial direction of the output shaft 310 on the side opposite from the gear member 312 due to the relative rotational force generated by the relative rotation between the gear member 312 and the engaging plate 314. When this relative rotational force (the force component) becomes equal to or greater than a predetermined value, the engaging plate 314 overcomes the resistive force and is thus forcefully moved in the axial direction of the output shaft 310 to release the engagement between the engaging projections 334 and the engaging recesses 350. Thus, the engaging plate 314, i.e., the output shaft 310 is rotated relative to the gear member 312.

Thus, in the state where the wiper is frozen to the wiping glass surface in the normal stop position in the rotational angular range or in the state where heavy snow is accumulated on the wiper held in the normal stop position to arrest the wiper, when the motor main body 92 is rotated to apply excessively large load or sudden load to the output shaft 310, the clutch device 304 is declutched. Also, during the operation of the wiper within the rotational angular range (the normal wiping range) of the wiper, when an excessively large force is applied to the output shaft 310 through the wiper, for example, when heavy snow accumulated on the roof of the vehicle falls along the glass surface onto the wiper, which is placed at a position other than the lower turning point at the time of wiping movement of the wiper, the clutch device 304 is declutched. Thus, it is possible to limit application of excessively large force to the drive force transmitting components (the components, such as the sector gear 132, the worm wheel 128, the worm gear 122 and the motor main body 92, which are located between the output shaft 310 and the armature 108) other than the gear member 312. In this way, each component, which is located after the gear member 312, can be protected. Thus, it is possible to limit damage to each above component and the burnout of the motor main body 92.

Furthermore, it is only required to set the strength of each component located after the gear member 312 based on the rotation transmitting force (the declutching force) between the gear member 312 and the engaging plate 314. Thus, it is not required to set the excessive strength of each component upon consideration of the excessively large external force (load). As a result, manufacturing costs can be reduced.

Furthermore, the driven component (e.g., the wiper), which is connected to the output shaft 310, can be also protected since the declutching of the clutch device 304 causes absorption of shocks applied to the driven component (e.g., the wiper).

As described above, the wiper motor apparatus 300 of the sixth embodiment achieves advantages similar to those of the third embodiment. Thus, it is possible to limit application of excessively large force to the drive force transmitting components (the components, such as the sector gear 132, the worm wheel 128, the worm gear 122 and the motor main body 92, which are located between the output shaft 310 and the armature 108) other than the gear member 312. In this way, each component, which is located after the gear member 312, can be protected.

In the above embodiments, the input disk (the first rotatable member), the clutch disk (the second rotatable member) and the resilient member(s) form a clutch arrangement of the present invention.

In the first to fifth embodiments, the first side mating portions 34, 36, 237 of the input disk 28, 128, 228 are formed as the mating male portions 34, 36, 237, which project in the axial direction of the output shaft 12. Also, the second side mating portions 50, 52, 242 of the clutch disk 38, 64, 238 are formed as the mating female portions 50, 52, 242, which are recessed in the axial direction of the output shaft 12. However, the present invention is not limited to this structure. For example, the first side mating portions 34, 36, 237 of the input disk 28, 128, 228 may be formed as recesses, which are recessed in the input disk 28, 128, 228 in the axial direction of the output shaft. Also, the second side mating portions 50, 52, 242 of the clutch disk 38, 64, 238 may be formed as projections, which project from the clutch disk 38, 64, 238 in the axial direction of the clutch disk 38, 64 238.

Similarly, in the sixth embodiment, the first side mating portions 350 of the gear member 312 are formed as the recesses, which are recessed in the axial direction of the output shaft, and the second side mating portions 334 of the engaging plate 314 are formed as the projections, which project in the axial direction. Alternatively, the first side mating portions 350 of the gear member 312 may be formed as projections, which project in the axial direction of the output shaft, and the second side mating portions 334 of the engaging plate 314 may be formed as recesses, which are recessed in the axial direction.

Also, in the above embodiments, when the load applied to the output shaft 12 is equal to or greater than the predetermined value, the input disk and the clutch disk are decoupled from one another, so that the relative rotation is made between the input disk and the clutch disk. It should be noted that this excessive load includes the excessive load applied to the rotating output shaft as well as the excessive load applied to the stationary output shaft (e.g. the excessive load applied to the output shaft, which is connected to, for example, the wiper that is frozen to the window glass during the winter season) at the time of rotating the input disk.

Additional advantages and modifications will readily occur to those skilled in the art. The invention in its broader terms is not limited to the above specific details, representative apparatus, and illustrative examples. Also, any component(s) of any one of the above embodiments can be combined with or replaced with any other component(s) of any other embodiments.

What is claimed is:

1. A motor apparatus comprising:
    an output shaft assembly that includes an output shaft and a clutch arrangement, which is installed to the output shaft;
    a housing, which receives the output shaft assembly; and
    a motor main body, which is connected to the housing to supply the drive force to the output shaft through the clutch arrangement, wherein
    the clutch arrangement includes:
        a first rotatable member, which is supported by the output shaft on a bottom side of the output shaft in such a manner that the first rotatable member is axially non-detachable from the output shaft and is rotatable about an axis of the output shaft, wherein the first rotatable member is rotated about the axis of the output shaft when a drive force is applied to the first rotatable member, and the first rotatable member has a plurality of gear teeth, which are formed in an outer peripheral part of the first rotatable member, a connecting wall, which connects axial ends of the gear teeth together, and at least one first side mating portion;
        a second rotatable member, which is located on a top side of the output shaft with respect to the first rotatable member and is supported by the output shaft in such a manner that the second rotatable member is non-rotatable relative to the output shaft and is axially movable along the output shaft relative to the first rotatable member, wherein the second rotatable member has at least one second side mating portion that is engageable with the at least one first side mating portion of the first rotatable member in an axial direction of the output shaft to couple between the first rotatable member and the second rotatable member and thereby to rotate the second rotatable member integrally with the first rotatable member; and
        at least one resilient member, which is arranged on a top side of the second rotatable member with respect to the first rotatable member and applies a resistive force against axial movement of the second rotatable member toward the top side of the output shaft from a coupled state, at which the at least one first side mating portion and the at least one second side mating portion are engaged with one another;
    a rotatable body that is connected to the first rotatable member to provide a rotational force to the first rotatable member upon rotation of the rotatable body;
    a swing member that has one end connected to the rotatable body, wherein the other end of the swing member includes a toothed portion, which is meshed with the gear teeth of the first rotatable member, and the swing member converts rotation of the rotatable body into a reciprocal swing motion of the toothed portion; and
    a holding member that is arranged on one side of the swing member in a thickness direction of the swing member and connects between a swing center axis of the toothed portion of the swing member and the output shaft to keep a constant distance between the swing center axis of the toothed portion of the swing member and the output shaft, wherein the connecting wall of the first rotatable member and the holding member hold the toothed portion of the swing member therebetween in the thickness direction of the toothed portion of the swing member.

2. The motor apparatus according to claim 1, wherein:
    the at least one resilient member includes at least one wave washer; and
    the resistive force of the at least one wave washer is a restoring force of the at least one wave washer, which is generated upon resilient deformation of the at least one wave washer that is caused by axial movement of the second rotatable member.

3. The motor apparatus according to claim 1, further comprising a base member, which is supported by the output shaft in such a manner that the base member is axially immovable relative to the support shaft and is non-rotatable relative to the output shaft, wherein the at least one resilient member includes a compression coil spring, which is spirally wound about the axis of the output shaft between the second rotatable member and the base member and is arranged in a compressed state.

4. The motor apparatus according to claim 1, wherein:
the housing rotatably supports the output shaft;
one of the first rotatable member and the second rotatable member of the output shaft assembly has a diameter larger than that of the other one of the first rotatable member and the second rotatable member and has a cylindrical peripheral surface, which is coaxial with the output shaft; and
a bearing member is secured to the housing to rotatably support the cylindrical peripheral surface of the one of the first rotatable member and the second rotatable member.

5. The motor apparatus according to claim 1, wherein:
the motor apparatus is for a wiper system, which includes a wiper; and
the motor apparatus further comprises a worm gear, which is provided to a rotatable shaft of the motor main body to rotate integrally with the rotatable shaft;
the rotatable body is a worm wheel, which is meshed with the worm gear and rotates about a rotational axis, which extends in a direction perpendicular to an axis of the rotatable shaft;
the one end of the swing member is connected to the worm wheel at a position spaced from the rotational axis of the worm wheel;
the toothed portion at the other end of the swing member is meshed with the gear teeth of the first rotatable member; and
the swing member is reciprocally swung by rotation of the worm wheel to reciprocally rotate the first rotatable member and thereby to reciprocally drive the wiper, which is directly or indirectly connected to the output shaft.

6. The motor apparatus according to claim 1, wherein the first rotatable member and the second rotatable member are coaxial with the output shaft, so that a resilient force of the at least one resilient member is generally uniformly dispersed in a connection between the first rotatable member and the second rotatable member.

7. The motor apparatus according to claim 1, wherein:
at least one of the first rotatable member and the second rotatable member is made of sintered metal, which is formed by molding and sintering powder alloy; and
the sintered metal of the at least one of the first rotatable member and the second rotatable member includes lubricant oil.

8. The wiper motor apparatus of claim 1, wherein the connecting wall is formed integrally with the plurality of gear teeth in the first rotatable member.

9. The wiper motor apparatus of claim 1, wherein the connecting wall extends along an imaginary plane that is perpendicular to the axis of the output shaft.

10. The wiper motor apparatus of claim 1, wherein the connecting wall extends radially outwardly from a dedendum circle of the gear teeth.

11. The wiper motor apparatus of claim 1, wherein the housing includes a cover plate, and an end surface of the output shaft at the bottom side of the output shaft is axially directly supported by the cover plate.

12. The wiper motor apparatus of claim 1, wherein the connecting wall and the holding member are axially placed adjacent to the toothed portion of the swing member to limit a substantial axial movement of the toothed portion of the swing member.

13. A wiper motor apparatus for reciprocally swing a wiper, the wiper motor apparatus comprising:
a housing;
an output shaft that is rotatably supported by the housing and is directly or indirectly connected to the wiper to reciprocally swing the wiper;
a first rotatable member that is supported by the output shaft and includes:
a plurality of gear teeth, which are formed in an outer peripheral part of the first rotatable member; and
a connecting wall that connects axial ends of the gear teeth together;
a rotatable body that is connected to the first rotatable member to provide a rotational force to the first rotatable member upon rotation of the rotatable body;
a swing member that has one end connected to the rotatable body, wherein the other end of the swing member includes a toothed portion, which is meshed with the gear teeth of the first rotatable member, and the swing member converts rotation of the rotatable body into a reciprocal swing motion of the toothed portion;
a holding member that is arranged on one side of the swing member in a thickness direction of the swing member and connects between a swing center axis of the toothed portion of the swing member and the output shaft to keep a constant distance between the swing center axis of the toothed portion of the swing member and the output shaft, wherein the connecting wall of the first rotatable member and the holding member hold the toothed portion of the swing member therebetween in the thickness direction of the toothed portion of the swing member; and
a clutch arrangement, which is installed to the output shaft, wherein the clutch arrangement includes the first rotatable member, a second rotatable member and at least one resilient member, wherein:
the first rotatable member further includes at least one first side mating portion and is supported by the output shaft on a bottom side of the output shaft in such a manner that the first rotatable member is axially non-detachable from the output shaft and is rotatable about an axis of the output shaft;
the second rotatable member is located on a top side of the output shaft with respect to the first rotatable member and is supported by the output shaft in such a manner that the second rotatable member is non-rotatable relative to the output shaft and is axially movable along the output shaft relative to the first rotatable member, wherein the second rotatable member has at least one second side mating portion that is engageable with the at least one first side mating portion of the first rotatable member in an axial direction of the output shaft to couple between the first rotatable member and the second rotatable member and thereby to rotate the second rotatable member integrally with the first rotatable member; and
the at least one resilient member is arranged on a top side of the second rotatable member with respect to the first rotatable member and applies a resistive force against axial movement of the second rotatable member toward the top side of the output shaft from a coupled state, at which the at least one first side mating portion and the at least one second side mating portion are engaged with one another.

14. The wiper motor apparatus according to claim 13, further comprising a flange portion, which is securely connected to the output shaft, wherein the at least one resilient member includes a compression coil spring, which is spirally wound about the axis of the output shaft between the second rotatable member and the flange portion and is arranged in a compressed state.

15. The wiper motor apparatus according to claim 13, wherein at least one of the first rotatable member and the second rotatable member is made of sintered metal, which is formed by molding and sintering powder alloy.

16. The wiper motor apparatus according to claim 15, wherein the sintered metal of the at least one of the first rotatable member and the second rotatable member includes lubricant oil.

17. The wiper motor apparatus according to claim 13, wherein:
- one of the at least one first side mating portion and the at least one second side mating portion is in a form of a projection, which projects in the axial direction of the output shaft;
- the other one of the at least one first side mating portion and the at least one second side mating portion is in a form of a recess, which is recessed in the axial direction of the output shaft;
- at least one of the at least one first side mating portion and the at least one second side mating portion has at least one slant surface, which is slanted relative to a circumferential direction of the output shaft; and
- when a rotational force is transmitted from the first rotatable member to the second rotatable member, the at least one slant surface generates a force component in the second rotatable member in the axial direction of the output shaft.

18. The wiper motor apparatus according to claim 13, wherein the first rotatable member has a cylindrical peripheral surface, which is coaxial with the output shaft and is rotatably supported by the housing.

19. The wiper motor apparatus according to claim 13, wherein, the holding member is arranged on the one side of the swing member, which is opposite from the rotatable body, in the thickness direction of the swing member.

20. The wiper motor apparatus of claim 13, wherein the connecting wall is formed integrally with the plurality of gear teeth in the first rotatable member.

21. The wiper motor apparatus of claim 13, wherein the connecting wall extends along an imaginary plane that is perpendicular to the axis of the output shaft.

22. The wiper motor apparatus of claim 13, wherein the connecting wall extends radially outwardly from a dedendum circle of the gear teeth.

23. The wiper motor apparatus of claim 13, wherein the housing includes a cover plate, and an end surface of the output shaft at the bottom side of the output shaft is axially directly supported by the cover plate.

24. The wiper motor apparatus of claim 13, wherein the connecting wall and the holding member are axially placed adjacent to the toothed portion of the swing member to limit a substantial axial movement of the toothed portion of the swing member.

25. An output shaft assembly comprising:
- an output shaft; and
- a clutch arrangement, which is installed to the output shaft, wherein the clutch arrangement includes:
  - a first rotatable member, which has at least one first side mating portion and is supported by the output shaft on a bottom side of the output shaft in such a manner that the first rotatable member is axially non-detachable from the output shaft and is rotatable about an axis of the output shaft, wherein the first rotatable member is rotated about the axis of the output shaft when a drive force is applied to the first rotatable member;
  - a second rotatable member, which is located on a top side of the output shaft with respect to the first rotatable member and is supported by the output shaft in such a manner that the second rotatable member is non-rotatable relative to the output shaft and is axially movable along the output shaft relative to the first rotatable member, wherein the second rotatable member has at least one second side mating portion that is engageable with the at least one first side mating portion of the first rotatable member in an axial direction of the output shaft to couple between the first rotatable member and the second rotatable member and thereby to rotate the second rotatable member integrally with the first rotatable member; and
  - at least one resilient member, which is arranged on a top side of the second rotatable member with respect to the first rotatable member and applies a resistive force against axial movement of the second rotatable member toward the top side of the output shaft from a coupled state, at which the at least one first side mating portion and the at least one second side mating portion are engaged with one another, wherein:
- the at least one resilient member includes at least one wave washer; and
- the resistive force of the at least one wave washer is a restoring force of the at least one wave washer, which is generated upon resilient deformation of the at least one wave washer that is caused by axial movement of the second rotatable member.

* * * * *